US012394333B2

(12) United States Patent
Trivedi et al.

(10) Patent No.: US 12,394,333 B2
(45) Date of Patent: Aug. 19, 2025

(54) SYSTEMS AND METHODS FOR REPLAYING A CONTENT ITEM

(71) Applicant: Adeia Guides Inc., San Jose, CA (US)

(72) Inventors: Vaishali Trivedi, Uttar Pradesh (IN); Padmassri Chandrashekar, Karnataka (IN); Daina Emmanuel, Bangalore (IN); Sukanya Agarwal, Haryana (IN); Ankur Anil Aher, Maharashtra (IN); Charishma Chundi, Andhra Pradesh (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 913 days.

(21) Appl. No.: 17/492,273

(22) Filed: Oct. 1, 2021

(65) Prior Publication Data

US 2023/0107968 A1     Apr. 6, 2023

(51) Int. Cl.
| | |
|---|---|
| *G09B 19/06* | (2006.01) |
| *G09B 5/06* | (2006.01) |
| *H04N 21/439* | (2011.01) |
| *H04N 21/45* | (2011.01) |
| *H04N 21/472* | (2011.01) |
| *H04N 21/485* | (2011.01) |

(52) U.S. Cl.
CPC ............ *G09B 19/06* (2013.01); *G09B 5/06* (2013.01); *H04N 21/4394* (2013.01); *H04N 21/4532* (2013.01); *H04N 21/47217* (2013.01); *H04N 21/4856* (2013.01)

(58) Field of Classification Search
CPC ............ G09B 5/04; G09B 5/06; G09B 19/06
See application file for complete search history.

(56) References Cited

U.S. PATENT DOCUMENTS

| | | | | |
|---|---|---|---|---|
| 7,260,355 B2* | 8/2007 | L'Allier | ................... | G09B 7/02 |
| | | | | 434/362 |
| 10,466,786 B2* | 11/2019 | Kim | ........................ | G16Y 40/10 |
| 2004/0023191 A1* | 2/2004 | Brown | ................... | G09B 19/04 |
| | | | | 434/156 |
| 2005/0053900 A1* | 3/2005 | Kaufmann | ............. | G09B 19/06 |
| | | | | 434/169 |
| 2006/0115800 A1* | 6/2006 | Daley | ................... | G09B 21/006 |
| | | | | 434/185 |
| 2008/0109207 A1* | 5/2008 | Wood | ..................... | G09B 19/06 |
| | | | | 704/2 |
| 2017/0039873 A1* | 2/2017 | Watanabe | ................ | G09B 5/06 |
| 2018/0211556 A1* | 7/2018 | Sreedhara | ............. | G09B 17/04 |
| 2020/0134013 A1* | 4/2020 | Pasternack | ............ | G06F 40/263 |
| 2020/0196022 A1* | 6/2020 | Sen | ........................ | G06F 40/247 |
| 2020/0410895 A1* | 12/2020 | Yakiwchuk | ............. | G10L 15/22 |
| 2021/0019369 A1* | 1/2021 | Sharma | .................. | G06F 40/263 |
| 2023/0036891 A1* | 2/2023 | Chen | ....................... | G09B 19/06 |

\* cited by examiner

*Primary Examiner* — Kurt Fernstrom
(74) *Attorney, Agent, or Firm* — Haley Guiliano LLP

(57) ABSTRACT

Systems and methods for replaying a portion of a content item based on the user's language proficiency level in a secondary language is disclosed. The system accesses a user profile comprising a user's proficiency level in at least one secondary language, the secondary language being their non-native language. A command to replay a first portion of a content item is received and, in response to receiving the replay command, the system generates for display the first portion of the content item at a level below the user's proficiency level in the secondary language.

20 Claims, 18 Drawing Sheets

| Captions to be Generated | | Captions at Lower proficiency level |
|---|---|---|
| 1110 | 1120 | |
| `<body region="subtitleArea">` | | `<body region="subtitleArea">` |
| `<div>` | | `<div>` |
| `<p xml:id="subtitle1" begin="0.23s" end="2.86s">` | | `<p xml:id="subtitle1" begin="0.23s" end="2.86s">` |
| [Background music: Frank Sinatra song New York New York playing] | | |
| He communicated to me that he will be right back with the information. | | He communicated to me |
| | | that he will be right back |
| [Traffic noise from outside the window] | | with the information |
| `</p>` | | `</p>` |
| `</div>` | | `</div>` |
| `</body>` | | `</body>` |

FIG. 11

```
<body region="subtitleArea">
  <div>
    <p xml:id="subtitle1" begin="0.76s" end="3.45s"
      It seems a paradox, does it not,
    </p>
  </div>
</body>
```

FIG. 14

```
<body region="subtitleArea">
<div>
<p xml:id="subtitle1" begin="0.23s" end="4.76">
1.  [Tires Screech]
2.  Person 1: Why don't you go to the shop to buy the grocery?
3.  Person 1: So? You gonna go?
4.  Person2: I can't, its not safe out there with those robbers running around.
5.  [Gun shots]
6.  [People Screeming]
</p>
</div>
</body>
```

FIG. 15

SYSTEMS AND METHODS FOR REPLAYING A CONTENT ITEM

BACKGROUND

Examples of the present disclosure relate to replaying a portion of a content item based on the user's language proficiency level in a secondary language, including rendering timed text in the secondary language or a primary language, changing the language of the audio of the content item, and adjusting playback speeds of the content item. They also relate to rewriting the timed texts file based on user language proficiency and using the rewritten file instead of the original timed text file.

SUMMARY OF INVENTION

Learning various skills by consuming online content has become very popular recently. Indeed, an individual can learn practical skills, such as changing an oil filter on a car, to soft skills, such as a new language, by consuming various video and/or audio content. For example, multiple language/dialect courses exist on platforms such as YouTube. In addition, individual's often watch TV shows and films in a secondary language to supplement their learning of the secondary language.

Closed captions, timed text and the use of subtitles are commonly used to provide a text version of speech and dialog in a content item. Timed texts enhance the user viewing experience by either translating a foreign language or providing a word-to-word synchronized transcript of a discussion between characters on a screen such that the user can read along while watching the content item. In addition to dialog, closed timed texting and subtitles may also describe other non-speech sound effects, such as a car chase, high winds, tornadoes, a lion's roar such that a user can read what is visually occurring in the content item.

In some countries closed timed texts are required by law to make speech and other audio accessible to people who are deaf or hard of hearing, especially in situations when the content item or broadcast is made using public channels, such as news or a presidential debate. Aside from serving the deaf or hard of hearing, timed text is frequently used by user's looking to learn a secondary language, or by user's who prefer non-dubbed content, and would rather read subtitles.

Subtitles differ from closed timed texting in the sense that they are not a word-to-word transcription of the dialog played back on the content item. Their typical use is to translate the dialog/speech depicted on display into other languages so the content item can be watched by viewers who do not understand the language spoken in the content item. For example, a French movie having all dialogue in French can be watched by an English-speaking viewer who does not understand French if the subtitles are provided in English. In some instances, a user can turn ON/OFF subtitles.

Current methods of assisting user's in learning languages are not tailored to the user's proficiency level in the secondary language and, therefore, closed timed texts and/or subtitling methods have several drawbacks. For simplicity, both closed timed texting and subtitling are collectively referred to herein as timed texts or timed text unless mentioned separately.

One such drawback is the amount of time timed texts are displayed on the screen. Since dialog and sound effects are associated with a scene being displayed on the display screen, timed texts are meant to be synchronized to provide context such that a viewer can see the relationship between the dialog (or other sounds and sound effects) and the scene displayed. However, in many instances, the amount of timed texted text to be read requires far greater time and cannot be read while the associated scene is displayed, this is exaggerated in a scenario where the user has a low proficiency level in the second language. This often results in the user being unable to read the actual subtitles of the spoken language in a content item before the scene changes to the next scene. In such situations, either the user continues watching and loses the full context of the scenes or rewinds and replays the scene to re-read the amount of timed texted text displayed.

In addition, in some examples, when the characters or subject-matter in the content item is spoken too fast, or a lot of action is packed into a scene (also referred to as a video frame, set of video frames, or video segment), the user may have to rewind and pause multiple times to be able to read and/or understand the content.

Moreover, in some examples, the user may be at a proficiency level in the secondary language that is below the current content item require would require for full understanding. So there is no way for the user to progress in their proficiency level of the secondary language without some changes being made to the content item or a portion of the content item. Current systems do not take into account a user's current language proficiency, and often do not associate the user selecting a secondary language to a desire to learn the language at all. Resulting in the user stagnating, losing interest, or not progressing as they should.

Some attempts have been made to assist in rewinding and replaying the content; however, such attempts are limited and only assist in rewinding and replaying. Such solutions still require the user to spend additional time watching the content and in many instances resulting in the user rewinding and replaying it multiple times. For example, Siri on Apple TV allows a user to replay such content by issuing a voice command where a user can say "what did she say" and the last 10/15 seconds of the video gets replayed with closed timed texts displayed. (Siri is a trademark owned by Apple Inc.) Other solutions can delay or speed up the display of subtitles but that only addresses the synching issues. These solutions do not solve the drawback of requiring the user to repeat a scene at the same proficiency level it was just played, read the larger amount of timed texted text within the timeframe of the related scene, or progress their learning of the secondary language.

In a first approach, there is provided a method comprising: accessing a user profile comprising a user's proficiency level in at least one secondary language; receiving a command to replay a first portion of a content item; in response to receiving the replay command, generating for display the first portion of the content item at a level below the user's proficiency level. In some examples, generating for display comprises generating audio and/or video. For example, the first portion may comprise an audio component or a video component or both an audio and video component, which are generated for consumption by the user.

In some examples, the method further comprises receiving a request to generate the content item in at least one secondary language and generating for display the first portion of the content item based on the user's proficiency level in the secondary language.

In some examples, the method further comprises receiving a request to generate the content item in a new secondary language, not in the user's profile, and creating a language profile for the new secondary language in the user profile. For example, the user may be a native English speaker and begins to consume a content item in French with English subtitles. Accordingly, a French language profile would be created in the user's profile. The user's proficiency level can be further determined and/or detected, as will be described in more detail below.

In some examples, the method further comprises detecting the user's proficiency level in a secondary language. In some examples, detecting the user's proficiency level of a secondary language comprises at least one of detecting if the user is using timed text in the secondary language; detecting if the user is using audio in the secondary language; detecting if the user is using audio in the secondary language and timed text in a primary language; detecting if the user has ever made a replay event while using audio in the secondary language; detecting if the user has ever made a replay event while using timed text in the secondary language; receiving an indication of proficiency level from a third party application; or receiving an indication of proficiency level from the user.

In some examples, the primary language is the user's native language. In some examples, the secondary language is the user's non-native language. For example, the user may be attempting to learn French but is a native English speaker. Accordingly, the primary language of such a user would be English and the secondary language would be French.

In some examples, the method further comprises determining the level below the user's proficiency level of the secondary language.

In some examples, generating for display the first portion of the content item at a level below the user's proficiency level comprises at least one of adding timed text in the secondary language to the first portion of the content item; adding timed text in a primary language to the first portion of the content item; changing language of timed text from secondary language to a primary language; changing language of audio from secondary language to a primary language, or changing a playback speed of the first portion of the content item.

In some examples, the method further comprises generating for display a first view and second view of the first portion of the content item; wherein the first view of the first portion is at the user's proficiency level; and wherein the second view of the first portion is at a level below the user's proficiency level.

In some examples, generating for display metadata based on the subject matter of the first portion. The metadata may be stored in a database or may be transmitted with the content item as a part of a master playlist. For example, a master playlist comprising a video track and/or audio track may also comprise a timed text (e.g., timed texts or subtitles) track comprising the metadata to be displayed. In some examples, the metadata comprises at least one of grammar, pronunciation, diacritical markings, use in a sentence, commons phrases or sayings, a definition, synonyms, antonyms, or a language of origin.

In some examples, the command is at least one of a voice request in a primary language of the user profile, a voice request in a secondary language of the user profile, the user selecting a word in the timed text, a user input, the user selecting a rewind button, a user selecting a timeline, or the user performing a scrubbing event on a timeline.

In some examples, the method further comprises, in response to receiving the replay command, tagging the first portion of the content item; and wherein the tag represents content that is difficult to understand at the user's proficiency level.

In some examples, the method further comprises identifying a second portion of the content item that has been tagged as difficult; wherein the second portion was tagged by at least one other user in historic viewing data, and applying playback settings at a level below the user's proficiency level to the second portion before the user consuming the second portion.

In some examples, the method further comprises receiving a timed text file associated with the content item, analyzing the timed text file, determining the user's proficiency level, rewriting timed text file based on the user's proficiency level, and generating for display text from the rewritten timed text file during consumption of the first portion of the content item.

In a second approach, there is provided a media device comprising a control module, a transceiver module, and a network module, configured to access a user profile comprising a user's proficiency level in at least one secondary language; receive a command to replay a first portion of a content item; in response to receiving the replay command, generate for display the first portion of the content item at a level below the user's proficiency level. In some examples, generating for display comprises generating audio and/or video. For example, the first portion may comprise an audio component or a video component or both an audio and video component, which are generated for consumption by the user.

In a third approach, there is provided a system comprising: means for accessing a user profile comprising a user's proficiency level in at least one secondary language; means for receiving a command to replay a first portion of a content item; in response to receiving the replay command, means for generating for display the first portion of the content item at a level below the user's proficiency level. In some examples, generating for display comprises generating audio and/or video. For example, the first portion may comprise an audio component or a video component or both an audio and video component, which are generated for consumption by the user.

In a fourth approach, there is provided a non-transitory computer-readable medium having instructions encoded thereon for carrying out a method, the method comprising: accessing a user profile comprising a user's proficiency level in at least one secondary language; receiving a command to replay a first portion of a content item; in response to receiving the replay command, generating for display the first portion of the content item at a level below the user's proficiency level. In some examples, generating for display comprises generating audio and/or video. For example, the first portion may comprise an audio component or a video component or both an audio and video component, which are generated for consumption by the user. As such, there is a need for a system and method for replaying a portion of a content item based on the user's language proficiency level in a secondary language, ensuring that the replaying of the portion of the content item is suitable to the user's language proficiency level, and providing solutions how to detect a user's language proficiency level.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 11 is a side-by-side view of a portion of original timed text timed texts and lower proficiency level timed text, in accordance with some examples of the disclosure;

FIGS. 14 and 15 are exemplary portions of timed text files, in accordance with some examples of the disclosure;

DETAILED DESCRIPTION

Figure 1:
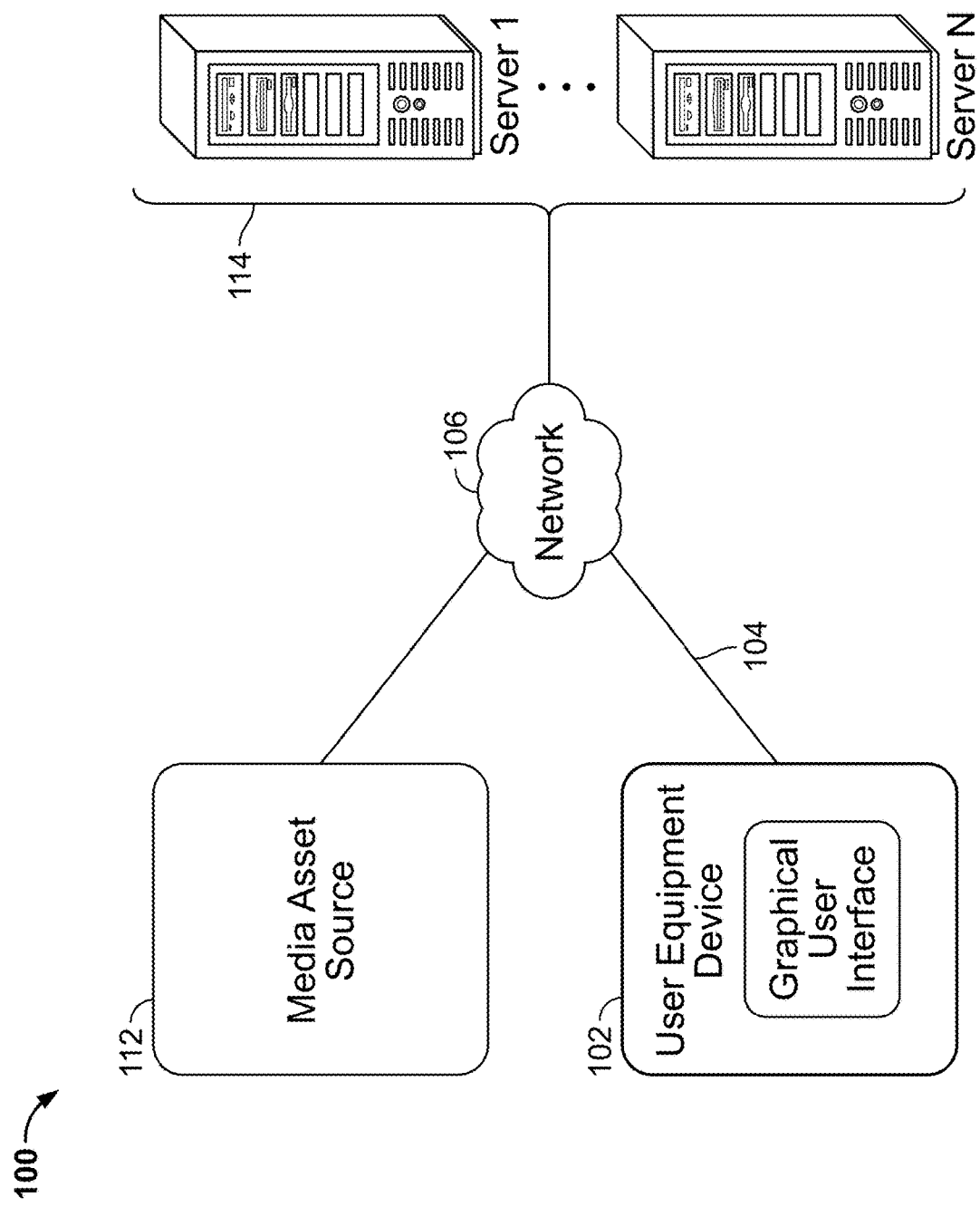
FIG. 1 is a block diagram of an exemplary system for rendering timed texted text and configuring playback speeds, in accordance with some examples of the disclosure.

In accordance with some examples disclosed herein, the above-mentioned limitations are overcome by one or more of replaying a portion of a content item based on the user's language proficiency level in a secondary language, which may comprise rendering timed text in the secondary language or a primary language; changing the language of the audio of the content item; adjusting playback speeds of the content item; rewriting a timed text file based on user language proficiency, which comprises using the rewritten file instead of the original timed texts file.

As will be described in more detail below, the methods and systems disclosed herein detect that the user is consuming content in a language that's different from the profile's native language, then an additional (e.g., secondary) language profile is created for that user, which is updated over time (e.g., based on user's interactions with content consumed in that language, as the user watches more and more content in the second language). For example, if the user watches most of the movies in English, and then starts watching content in French, then a French language profile is created.

In some examples, the system can also collect basic info from the user about their knowledge of the new language (i.e., proficiency level). Similarly, the user can manually trigger the creation of the second language profile. This information can also be inferred based on the playback of the media content. For example, the user's proficiency level can be determined in part based on whether the user watching the movie in French without displaying the English closed-caption or subtitles (content could be dubbed in various languages).

In some examples, the user's proficiency level is tied to the command to replay a segment. For example, as mentioned above, currently Siri on Apple TV accepts a user input such as "what did he say" and automatically replays the last 15 seconds of content with auto-captions. In some examples, the audio segment and timed text track may also be altered (e.g., language, playback speed, removal of unnecessary content, or the like). That is to say that, for content being consumed in French without subtitles, after a replay command, the content can be replayed back in English and/or the English subtitles can be displayed.

Moreover, in some examples, metadata comprising one or more of grammar, pronunciation, diacritical markings, use in a sentence, commons phrases or sayings, a definition, synonyms, antonyms, or a language of origin can be displayed to the user. In some examples, the metadata is displayed after selection or as a summary of new words that the user has encountered during the content item that the user has had little or no exposure to before. For example, the user may watch a French broadcast of the Olympics and the system provides some metadata that describes the grammatical differences between some sports requiring the preposition jouer, meaning to play, and others requiring the preposition, faire, meaning to do. In some examples, the metadata is not related to the content item being consumed but is rather things to learn for the next episode or content item, so the user can learn a word or phrase then watch out for it in the next content item to be consumed.

In another example, the replay of the first portion of the content item occurs in a split screen or split view, one view comprising the primary language (e.g., English) version of the content item and the other view comprising the secondary language (e.g., French) version of the content item. For example, after receiving a command to replay the first portion of a content item, the timed text in both languages are displayed for the user in a split screen view. The split screen view is used to replay the segments in both languages (e.g., English and French). This example and other examples are not intended to be mutually exclusive, indeed one or more examples may be combined to create an entirely new example. For instance, the split-screen view and timed text on each view may be displayed along with metadata about the sentences—e.g., nouns, adjectives, verbs, etc.

In some examples, providing both the primary and secondary language in the timed text acts as one-to-one mapping for the user to compare the two languages—for example, "to split hair" and its French meaning "Chercher la petite bêthe." This information would already be present in the timed text track of an adaptive video stream and, therefore, this functionality is the system, and more particularly a replay algorithm, that provides data from one or more segments, or one or more audio tracks (e.g., languages).

In some examples, the split view is provided on one display device, as a Picture in Picture (PIP). In some examples, the split view is provided over two or more devices. For example, the primary language (e.g., English) version on the user's smartphone or personal device in response to the command to replay, and replay the secondary language version (e.g., French) on the user's TV.

In some examples, the command to replay a portion of a content item is in response to a voice command. However, In another example, the replay can occur in response to the user selecting a word in the closed-caption content or timed text. In this way, the timed text file is automatically parsed to make each line or each word of the captions selectable. In these examples, the replay occurs from the point at which the word was mentioned in the dialogue or the beginning of the line. This is based on timed metadata—i.e., utilizing the synchronization metadata between the video segment and its corresponding audio segment, as well as identifying and retrieving the corresponding audio segment from the second language track.

Rewriting the timed text file comprises determining the user's language proficiency and reading pace. Rewriting also includes customizing and personalizing timed texts based on user preferences, user consumption history of content items, user profile, and other user online interactions.

In some examples, the timed text file is analyzed prior to the consumption of the content item, or at least a later portion of the content item, different to the portion being consumed presently. Accordingly, after the analysis, certain portions of the content item can be flagged as potentially difficult to understand. Alternatively, after a replay event, the present portion of the content item can be flagged retrospectively as difficult to understand. In some examples, the flag indicating a potential difficult portion to understand can automatically cause the system to apply settings at a level below the user's proficiency level of the secondary language.

For example, closed-captions can be activated based on analysis of the audio content itself, the analysis comprising determining if background noises in the content are interfering with the main dialogue, especially if the background noise (e.g., music, or the like.) might be perceived as dominant to a particular viewer. The system can mark or tag portions of a content item, collecting data regarding content where the user initiated the display of closed caption (e.g., manually using a remote control, or via other means such as a voice command, etc.). This data relating to activation/deactivation of the display of closed-caption data can be collected from all the services and apps that the user engages with. In addition, this data can be collected from other user's and used to infer that the present user may find a segment difficult as they are at a similar or same proficiency level at the secondary language. Accordingly, in some examples, a closed-caption profile can be created for one or more user's for any particular content item. The data from one or more users can be used to train a machine learning algorithm or big data algorithm to detect people screaming (e.g., 2 actors are speaking over each other), audio that's not easily comprehended, for example, it might be hard for some people to understand a person that is crying and talking at the same time, and other noises present in the content item (e.g., loud engines, dialogue near in a noisy environment, etc.).

In some examples, it is preferred to collect "real" data from content items that users have activated timed text or initiated a replay command to train the algorithm. However, in some examples, it is preferred to created training data from a separate algorithm. In some examples, the flagged data can be manually labelled in a first instance (which is a common technique used by some ML algorithms) into different categories, such as loud background noises, a person crying, screaming, etc. Thereafter, existing sound classification models can be used to classify or categorize sounds based on their properties (cry vs laugh). For example, Apple's Create ML. In these classification models, training data, such as a labeled audio data (sound files) are provided to a machine learning algorithm (e.g., Create ML), which in turn trains a classifier model.

In some examples, the metadata of the timed text file comprises data tagged as difficult to understand, which is used to signal to a media player ahead of consumption of the portion of the content item the scenes or segments where timed text may be required and automatically applied. In some examples, the sensitivity of such a feature is tunable, for example, +/−one or more proficiency levels of the user's secondary language-including turning off the feature in its entirety.

In some examples, the timed text can be rewritten to remove the closed captions and just provide the subtitles. In other examples, the subtitles themselves can be summarized, however, in such instances, care must be taken not to remove the meaning of the portion of the content item. For example, summarization make include replacing words, using synonyms and antonyms, using icons, or rewording the text. Various speech recognition software, virtual assistants, or web services may also be used to determine which words and phrases are to be summarized and personalized, including the format of the summarized text.

Machine learning and artificial intelligence algorithms may also be used in generating a model that can be trained to understand user preferences based on user consumption patterns and other user communications and online interactions. The trained and periodically updated model can be used to summarize the timed texts text presented. The summarization and/or modification can occur either in real-time, at the point of selection of the content item for playback, or during an earlier playback portion of the content item, such as during the introductions or credits. A user interface may also be generated and presented to the user for approving the summarized words and phrases. For example, the user interface may present a list of all summarized words and phrases to the user at the end of the playback of the content item. The summary of words/phrases replaced or summarized may also be available at any interim point during the playback of the content item. The user may either approve or reject the summarized or replaced words and phrases and the feedback may be used by the machine learning and artificial intelligence algorithms to continuously or at periodic intervals update the user preferences. The feedback and other data based on user consumption may be used to enhance the algorithms and summarize future timed texted text with a higher probability of meeting user preferences.

In yet another example, the system may automatically rewrite a timed text file when repeated replay actions or commands are detected. In this example, the system may detect a rewind command for a segment of the content item. If the number or rewind commands received exceed a threshold, then the system may determine if the rewind is related to the additional time needed by the user for reading the timed texted text. This may be determined using several mechanisms, for example, the system may determine the number of timed texted words or characters displayed on the screen and the start and end time of the corresponding scene. If the system determines that the number of words cannot be read within the start/end time of the corresponding screen either by an average reader or specifically by a user with the proficiency level of the present user viewing the content item, then the system may associate the rewind with as an indication that the user requires additional time to read the timed texted text.

As such, if the number of rewinds exceeds the threshold, which may be 1, 2, 3, or X number of rewinds as defined by the user or the system then the system may automatically rewrite or summarize the timed text file based on user preferences, user language proficiency, user's reading pace, user profile, media consumption history, or other factors that are mentioned throughout this application. In another example, if the number of rewinds exceeds the threshold it may trigger a command to generate the summarized version of the set of timed texts when the number of words, or characters, in the set of timed texts exceed a word, or character, count threshold.

The system may also automatically turn ON summary mode at any point during playback if a detection is made that timed texts associated with the current video segment, or an upcoming video segment, include words or characters that exceed a threshold thereby signaling that the number of words or characters cannot be read within the timeframe of the associated video segment's start and end times based on the user's proficiency level of the secondary language. The terms "frame," "set of frames," "segment," or "video segment," are used interchangeably and refer to a portion of the content item within a specific timeframe.

In another example, the system may determine whether the user requires additional time to digest the dialog presented in a scene. If additional time is required, then the system would automatically slow down the playback speed of one or more portions of the content item such that the user has adequate time to digest the dialog, audio, and other audible sounds presented through the content item. The speeds may automatically be adjusted to a default setting or the user may predefine a preferred speed that can be used for playback when such a situation arises.

In another example, the system includes a manifest file, which is used by the system to configure and deploy various functions. In one example, the manifest file references the timed text file. The manifest file also lists URL(s) that reference the media segment files. Streaming protocols such as DASH and HLS rely on the use of manifest files, referred to as a master playlist, to request media segment files (e.g., small files that are few seconds long) to play video and/or audio data. In operation, the manifest file may be sent along with the content item or separately as a "side car" file to the media device, such that it can be used to configure and deploy various media device functions.

In another example, the system may rewrite the closed timed text or subtitled file. In this example, the system may consider the user's preferences, language proficiency levels, past consumption history, user profile, and other sources of data, such as user interactions with social media, to rewrite the closed timed text and/or the subtitled file and personalize it to the user's language proficiency and likings. The original timed text file may be replaced with the rewritten/manifest timed text file and used during the playback of the content item. When the file is rewritten, the manifest file references the newly rewritten file instead of the original timed texts file. Alternatively, the user may also prefer a side-by-side display of original and rewritten timed text files for a particular segment of the content item where the user desires to see both. The system may rewrite the timed text file at any given time, such as before, during, or after the playback of the content item. The system may also rewrite the timed text file associated with a content item, or a plurality of content items when the content item(s) are placed into a playlist, selected for display, or scheduled for future consumption.

Figure 2:
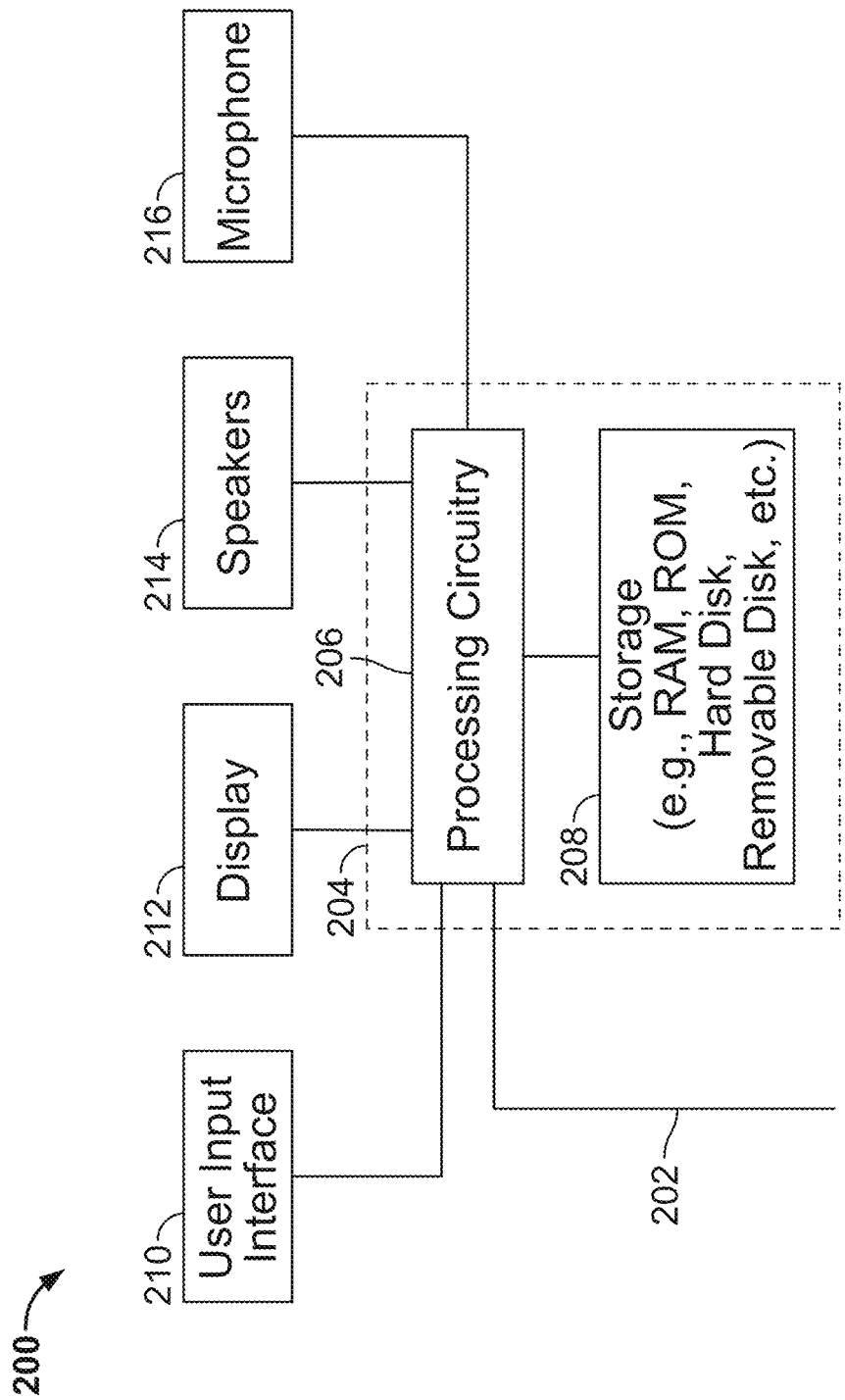
FIG. 2 is a block diagram of a generalized media device, in accordance with some examples of the disclosure.

FIGS. 1-2 depicts exemplary devices, systems, servers, and related hardware for generating for display the first portion of a content item with or without timed texts of a content item based on the user's language proficiency level and reading pace, including customizing the timed texted file and automatically configuring playback speeds of the content item, in accordance with one example. They also describe exemplary devices, systems, servers, and related hardware for rewriting the timed texted file based on user language proficiency and other factors and using the rewritten timed text file instead of the original timed texted file, in accordance with one example. In system 100, there can be more than one user equipment device 102 but only one is shown in FIG. 1 to avoid overcomplicating the drawing. In addition, a user may utilize more than one type of user equipment device and more than one of each type of user equipment device. In an example there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an example, the user equipment devices may also communicate with each other directly through an indirect path via the communications network 106.

The user equipment devices may be coupled to communications network 106. Namely, the user equipment device 102 is coupled to the communications network 106 via communications path 104. The communications network 106 may be one or more networks including the Internet, a mobile phone network, mobile voice or data network (e.g., a 4G, 5G, or LTE network), cable network, public switched telephone network or other types of communications network or combinations of communications networks. Path 104 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one example path, 104 can be a wireless path. Communication with the user equipment device may be provided by one or more communications paths but is shown as a single path in FIG. 1 to avoid overcomplicating the drawing.

System 100 also includes content item sources, such as video asset sources 112, and one or more servers 114, which can be coupled to any number of databases providing information to the user equipment devices. The information sources 112 represent any computer-accessible sources, such as servers, databases, platforms (such as video sharing platforms) that store content items, such as video assets. The server 114 may store and execute various software modules, such as, for example, rewriting timed text files, flags for difficult portions to understand, user's proficiency level, determining playback speeds, and training the machine learning algorithms. In some examples, the user equipment device 102, content item sources 112, and server 114 may store metadata associated with content items. In some examples, the server may transmit a command to cause the display of a user interface on the display screen of a content item device. The user interface may be used by the user to select preferences, execute commands, and approve or reject rewritten time text. The user interface may also be used by the system to obtain a user profile or user consumption history.

FIG. 2 shows a generalized example of a user equipment device 200, in accordance with one example. In an example, the user equipment device 200, is the same user equipment device 102 of FIG. 1. The user equipment device 200 may receive content and data via input/output (I/O) path 202. The I/O path 202 may provide audio content (e.g., broadcast programming, on-demand programming, Internet content, the content available over a local area network (LAN) or wide area network (WAN), and/or other content) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The rendering of timed texts and subtitles of a content item based on the user's language proficiency level, including customizing the closed timed texted file and automatically adjusting playback speeds of the content item and related functions and processes as described herein can be at least partially implemented using the control circuitry 204. The rewriting of the timed texted file based on user language proficiency and other factors, and having the manifest file reference the rewritten timed text file instead of the original timed texted file and related functions and processes as described herein can also be at least partially implemented using the control circuitry 204. The processes as described herein may be implemented in or supported by any suitable software, hardware, or combination thereof. They may also be implemented on the user equipment, on remote servers, or across both.

In client-server-based examples, the control circuitry 204 may include communications circuitry suitable for communicating with one or more servers that may at least implement the storing of the content items, timed text files, summarized files, substituted words, machine learning and artificial intelligence algorithms, master playlist, timed text and subtitle files and related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices or communication of user equipment devices in locations remote from each other (described in more detail below).

A memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder or PVR), solid-state devices, quantum storage devices, gaming consoles, gaming media, or any other suitable fixed or removable storage devices, and/or any combination of the same. The storage 208 may be used to store various types of content described herein, such as content items, substituted words, machine learning and artificial intelligence algorithms, manifest, timed text and subtitle files, user profile, user consumption history, and metadata associated with the content item. Nonvolatile memory may also be used (e.g., to launch a boot-up routine and other instructions). Cloud-based storage, described in relation to FIG. 1, may be used to supplement storage 208 or instead of storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the user equipment device 200. The control circuitry 204 may also include digital-to-analog converter circuitry and analog-to-digital converter circuitry for converting between digital and analog signals. The tuning and encoding circuitry may be used by the user equipment device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If storage 208 is provided as a separate device from the user equipment device 200, the tuning and encoding circuitry (including multiple tuners) may be associated with storage 208.

The user may utter instructions to the control circuitry 204, which are received by the microphone 216. The microphone 216 may be any microphone (or microphones) capable of detecting human speech. The microphone 216 is connected to the processing circuitry 206 to transmit detected voice commands and other speech thereto for processing. In some examples, voice assistants (e.g., Siri, Alexa, Google Home and similar such voice assistants) receive and process the voice commands and other speech.

The user equipment device 200 may include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the user equipment device 200. For example, the display 212 may be a touchscreen or touch-sensitive display. In such circumstances, interface 210 may be integrated with or combined with the microphone 216. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some examples, the interface 210 may be HDTV-capable. In some examples, the display 212 may be a 3D display. The speaker (or speakers) 214 may be provided as integrated with other elements of user equipment device 200 or may be a stand-alone unit. In some examples, display 212 may be outputted through speaker 214.

The user equipment device 200 of FIG. 2 can be implemented in system 100 of FIG. 1 as user equipment device 102, but any other type of user equipment suitable for the rendering of timed texts and subtitles of a content item based on the user's language proficiency level and reading pace, including customizing the timed texted file and automatically adjusting playback speeds of the content item and related functions and processes as described herein. It may also be implemented in system 100 as user equipment device 102, but any other type of user equipment suitable for rewriting the timed texted file based on user language proficiency and other factors and using the rewritten timed text file instead of the original timed texted file and related functions and processes as described herein. For example, user equipment devices such as television equipment, computer equipment, wireless user communication devices, or similar such devices may be used. User equipment devices may be part of a network of devices. Various network configurations of devices may be implemented and are discussed in more detail below.

Figure 3:
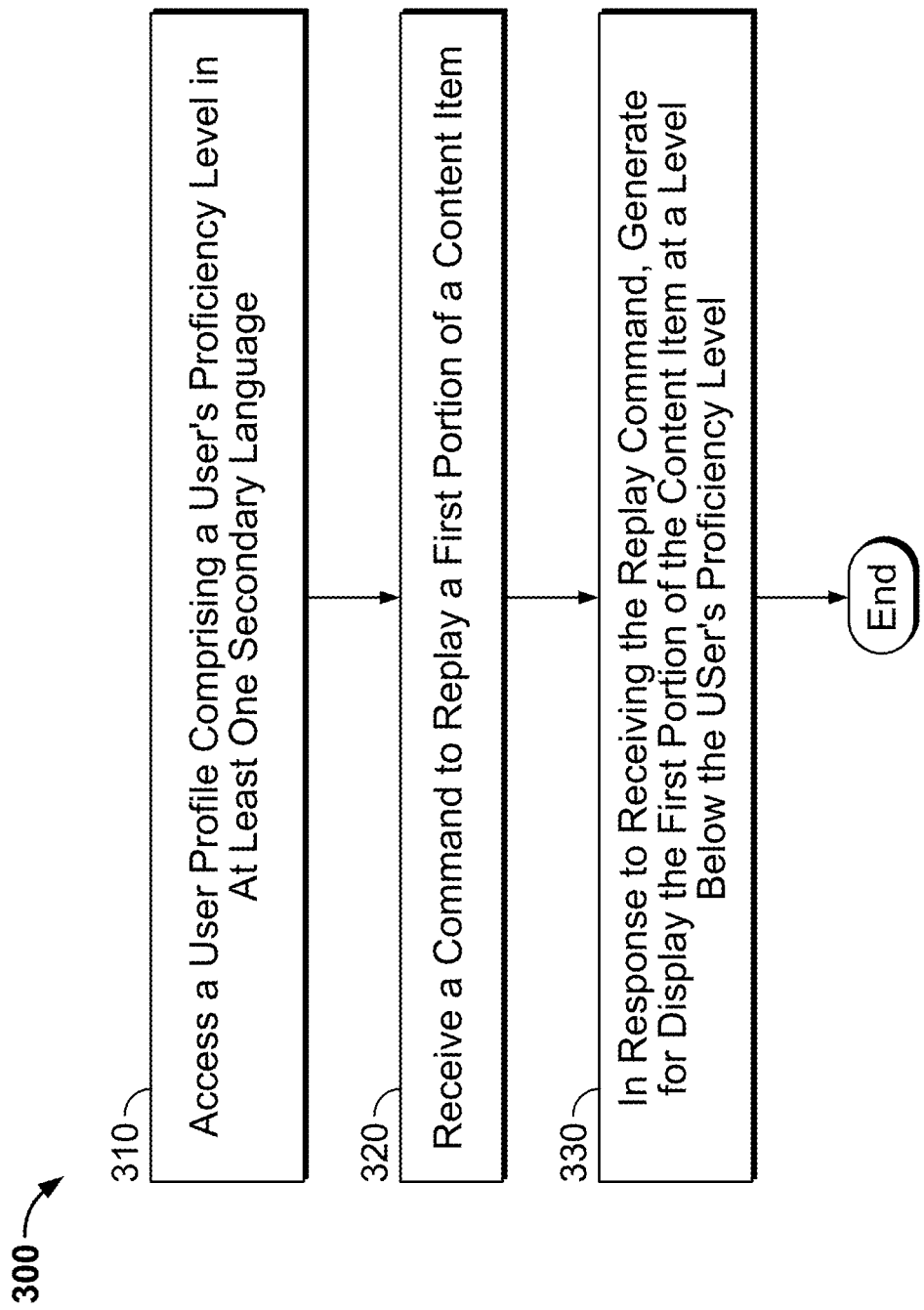
FIG. 3 is a flowchart of a process for generating a portion of a content item at a level below the user's proficiency level, in accordance with some examples of the disclosure.

FIG. 3 is a flowchart of a process 300 for generating for display the first portion of a content item at a level below the user's proficiency level of a secondary language, in accordance with some examples of the disclosure. The process results in rewriting the timed text file (e.g., subtitles and/or closed captions) based on the user's language proficiency, reading pace, and additional factors.

The content item may be a video asset, such as a video taken from a mobile phone to a movie, episode, documentary, to an animation, etc. The content item may also be a television show, a movie, a documentary, a new segment, a website page, a music album, a song, or any other type of audio or video asset. The system may detect the display of the content item by receiving an indication. The indication may be in response to a content item selection made by a user using a user interface. The indication may also be system generated to signal that content is being displayed.

Process 300 begins at step 310. At step 310, a user profile comprises a user's proficiency level in at least one secondary language is accessed.

While consuming the content item, in particular a first portion of the content, the user may not fully understand the first portion of the content, due to that particular portion requiring a proficiency level currently above the user's particular proficiency level. In some examples, the level may be at the user's proficiency level, however, other factors such as background noise or music distract the user from fully paying attention and missing crucial information. Accordingly, the user may make a command to replay the first portion of the content item. Thus, at step 320, the system receives a command to replay the first portion of a content item.

At step 330, in response to receive the replay command, the system generates for display the first portion of the content item at a level below the user's proficiency level. As will be described in more detail below, with regard to at least FIGS. 5A, 5B, 6 and 16, the level below the user's proficiency level can be determined in a number of ways, such as via user input.

As described earlier, a timed text file may comprise closed captions or subtitles. The timed text file includes a textual representation of speech and dialog of characters displayed in the content item for a particular segment of time. For example, a set of timed texts may be synchronized and associated with a particular video segment of the content item (such as being embedded with the associated video segment). The timed text file may also include a description of non-speech audible sounds, such as sound effects and background sounds and noise. It may also include a transcription of the speech and dialog or a translation from a foreign language that is subtitled.

The timed text file may be rewritten to remove references to the non-dialog content to the number of closed captions the user has to read, thus lowering the level of proficiency required in a secondary language to read the closed captions. In some examples, the system may use natural language processing (NLP) to process the timed text file such that timed texts can be intelligibly replaced. For example, the system may employ various NLP techniques combined with artificial intelligence to determine the context of the timed texts. It may also apply linguistic meaning to timed texts such that suitable replacements can be made based on the context and linguistic meaning.

Figure 4:
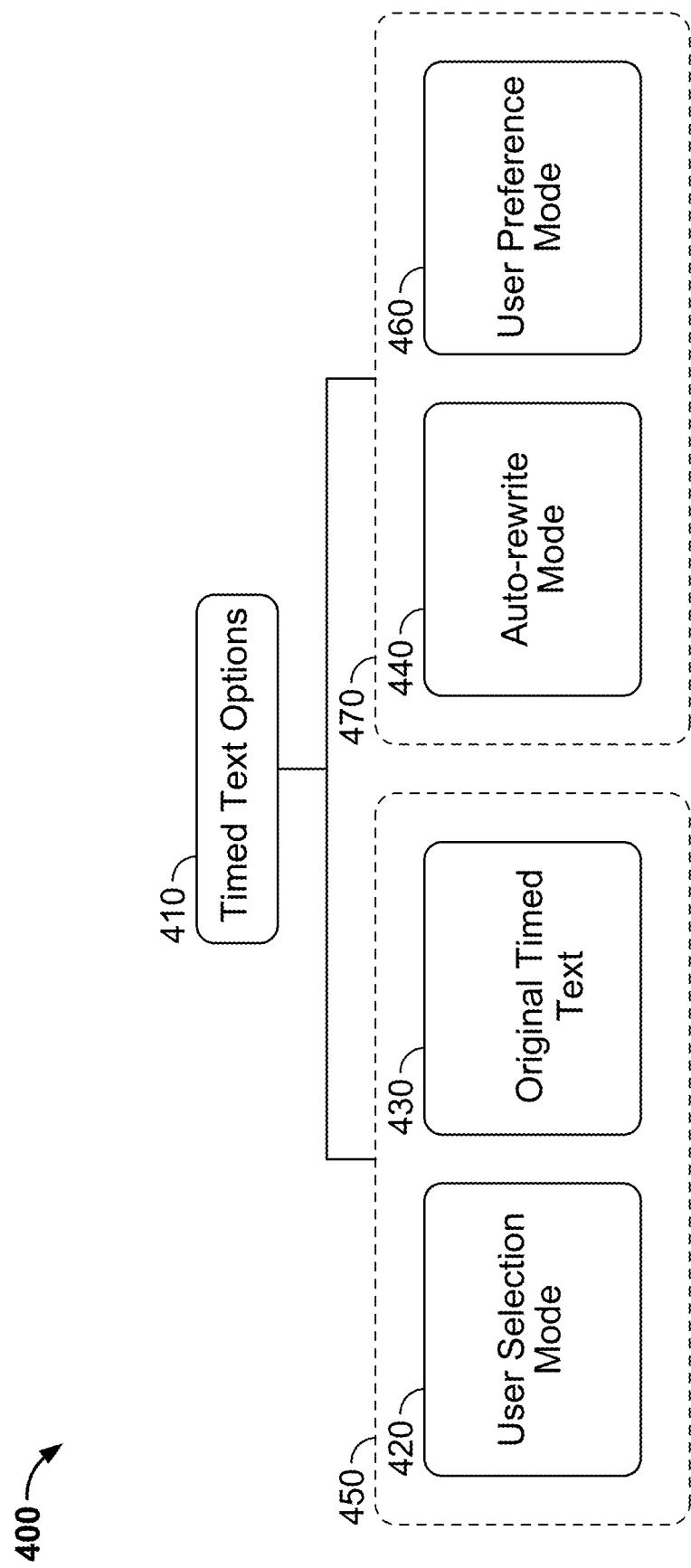
FIG. 4 is a block diagram for selection timed texting options, in accordance with some examples of the disclosure.

As depicted in FIG. 4, the timed texting options include a user selection mode 420, original timed text mode 430, auto-rewrite mode 440, and user preference mode 460.

In one example, the system may automatically, as a default, have the auto-rewrite mode 440 turned ON. In this scenario, the timed text file may be rewritten on a case-by-case, frame-by-frame, segment-by-segment, or portion-by-portion basis. In some examples, the timed text file may be rewritten when a determination is made that the number of words displayed for a particular segment exceeds the threshold number of words that either an average user or specifically the user watching the content item, can read based on their particular proficiency level of the secondary language.

For example, a determination may be made as to whether the number of words displayed for a particular segment exceeds the threshold number of words that can be read and understood by the user. The determination may involve considering factors such as the number of words or characters, length of the sentence, the complexity of words, the duration between the start/end times when the timed texts would be displayed (indicated in the timed text file), as well as the language proficiency level indicated in the user's profile. The times in the timed text file indicates the times at which the text will be displayed and a time at which the text will be removed from display. For example, a timeframe of 00:07:24.000→00:07:31.100 defines the start and end time of the closed captions in the timed text and the associated video segment that will be displayed.

In some examples, re-writing the timed text file comprises changing the language of the timed text from the secondary language to the user's primary language. For example, converting the text from French (the secondary language the user is learning) to English (the user's primary language) for one or more portions of the content item.

In another example, the server may transmit a command to generate a user interface on a media device that is being used to watch the content item. The user interface, such as the user interface described in FIG. 1 that is part of the user equipment 102, may be used by the user to make selections. The server may display a plurality of options to the user for turning timed text ON or OFF.

In yet another example, the user may initiate the timed text option in response to an action, such as in step 460, where the system receives a command to replay the first portion of a content item. For example, the system may detect a rewind command for a portion (e.g., a segment) of the content item that may be represented by a plurality of frames and therefore generate the first portion at a level lower proficiency level based on the user preferences.

The user section summary mode 420 and original timed texts mode 430 are user selected modes 450 while auto-rewrite mode 440 and user preference mode 460 are system selected modes 470 that are automatically selected by the system.

Referring back to step 350, if the timed texts are turned OFF altogether, then the system does not use timed texts for lowering the proficiency level of the first portion of the content item, in response to receiving the replay command.

Figures 5A, 5B:
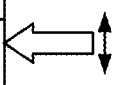
FIGS. 5A and 5B are block diagrams for selecting language proficiency level, in accordance with some examples of the disclosure.

In one example, the user interface may provide selectable options, such as a slider or a scale, that can be selected by the user to define their language proficiency level. For example, as depicted in FIGS. 5A and 5B, the user may select their language proficiency on a scale of 1 to 10. In another example, the user interface may provide a different proficiency grading level, such as in FIG. 5B, where the user can self-identify themselves as a beginner, intermediate, superior, or expert. In another example, the system may auto select or define a user's language proficiency level by selecting a level in either FIG. 5A or FIG. 5B. Although some exemplary proficiency scales are depicted in FIGS. 5A and 5B, the example is not so limited and other proficiency grading scales are also contemplated. In some examples, the user language proficiency can be determined without input from the user, and based on the user's actions.

Figure 6:
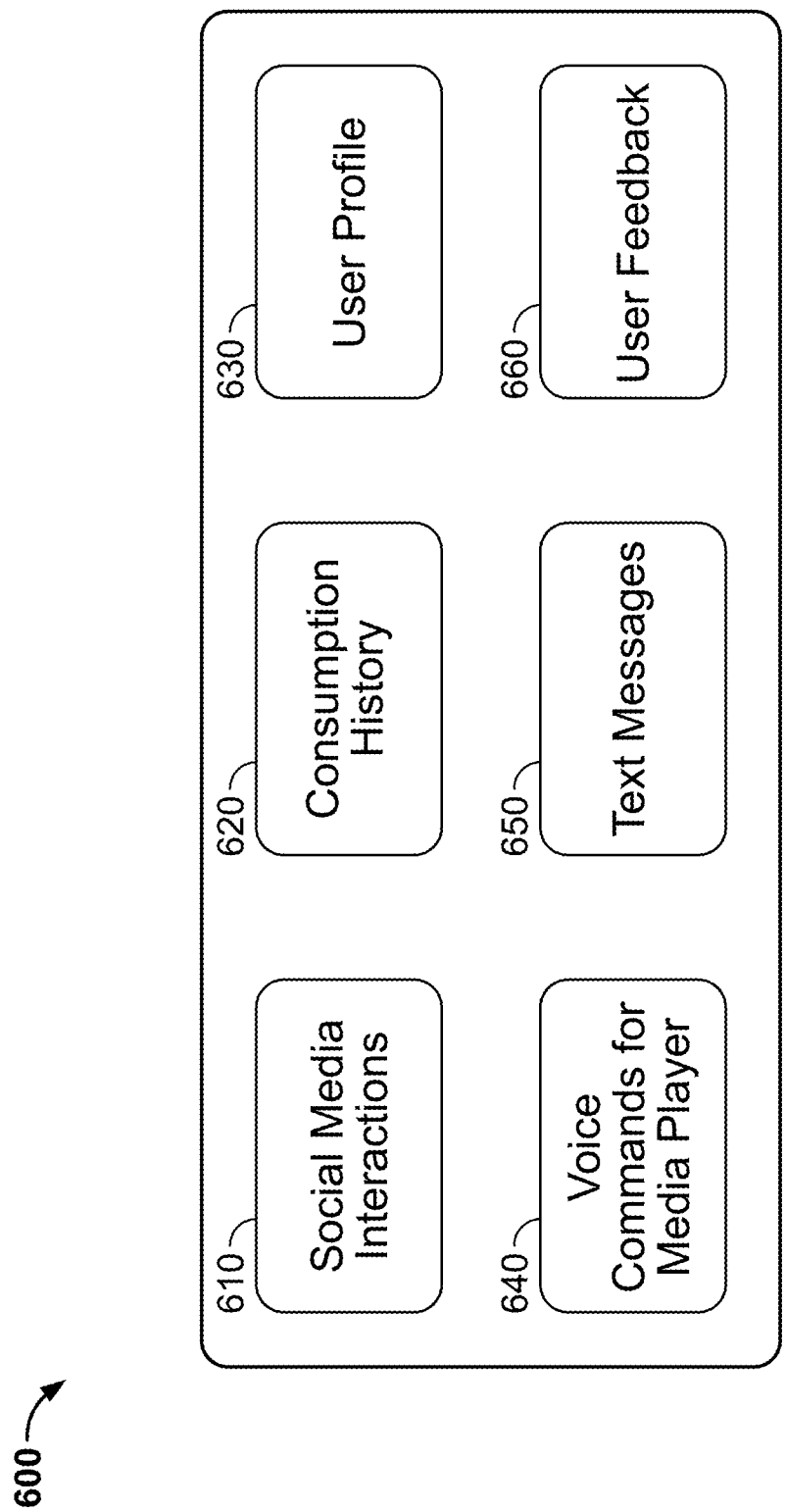
FIG. 6 is a block diagram of a plurality of factors that may be considered in determining the proficiency level of a portion of a content item to be replayed, in accordance with some examples.

Language proficiency levels can be determined based on several factors. For example, FIG. 6 is a block diagram 600 that depicts a plurality of categories or factors that may be considered in determining the summarized text for the content item, in accordance with some examples. The consideration may be based on an analysis of metadata associated with each category/factor.

As represented by block 610, the summarized text may be based on social media interactions 610 of the user. In this example, the user may authorize the system to access all its online accounts. Once authorized, when a user posts to an online account, comments on an online post or performs other online textual or graphical social media interactions in a secondary language, a machine learning algorithm captures the data and uses it to develop a model. The model represents user social media history and determines the language, icons, emojis, and other graphics used by the user as an indicator of the user's language proficiency level and preferred words/phrases. The algorithm is enhanced based on the volume of data gathered and is trained overtime to predict with a higher probability the words/phrases that the user is comfortable with, or prefers, such that those words and phrases can be used when determining what level is below the user's current proficiency level for generating for display the first portion of the content item; or indeed rewriting, summarizing, or replacing the timed text file.

As represented by block 620, the summarized text may be based on the user's consumption history of other content items. In this example, the user may have watched other content items previously in which timed texts were activated for a given secondary language substituted with a summarized text.

As represented by block 630, the summarized text may be based on the user's profile. The user may have set certain preferences in the user profile or defined their level of language proficiency.

As represented by block 640, the summarized text may be based on the user's voice commands, or textual commands via a keyboard or touchscreen, that are inputted to operate functions of the media device or the user interface in the secondary language. For example, an indication that the user is more proficient in a given language if instead of asking "what did he say?" to voice assistance, they ask the equivalent in the secondary language (e.g., French), qu'a t'il dit?. Since some media devices allow commands through voice input, such as through a remote control, or textual input through a keyboard or touchscreen, the machine learning algorithm captures the data from such interaction and uses the words and phrases, or graphical representations, as an indicator of user language proficiency and preferred words and phrases. The algorithm is continuously trained and enhanced based on the volume of data gathered to aid in determining what level is below the user's current proficiency level for generating for display the first portion of the content item.

As represented by block 650, the summarized text may be based on the user's texts and multimedia messages, such as through the user's cell phone or tablet, in the secondary language. For example, the user may have a friend, partner or family member that they communicate with in the secondary language. The abbreviations, emojis, emoticons, used during texting are representative of a summarized form of text that the user is comfortable and proficient in when communicating. In addition, text input for the user's Twitter account may be representative of the lesser characters used by the user to communicate a message. Twitter is a trademark owned by Twitter, Inc. Such text and Twitter messages may be highly relevant when the timed text file has a number of words that exceed the threshold limit of words that a user cannot reasonably read, or the specific user cannot read, within the start and end times of display of the associated video segment. Since characters in Twitter are also limited, and the user may type texts which are a shorter form of the full conversation, such input can be used by the machine learning algorithm to determine the type of text or lingo that is user friendly and comfortable to the user such that same or similar text can be used.

As represented by block 660, the summarized text may be based on the user's feedback. For example, the user may provide feedback with respect to the current content item or for a previously viewed content item by approving or rejecting terms that were replaced by the system. Such feedback may be used to further train the machine learning algorithm on the user's preferences and determining what level is below the user's current proficiency level for generating for display the first portion of the content item.

Figure 7:
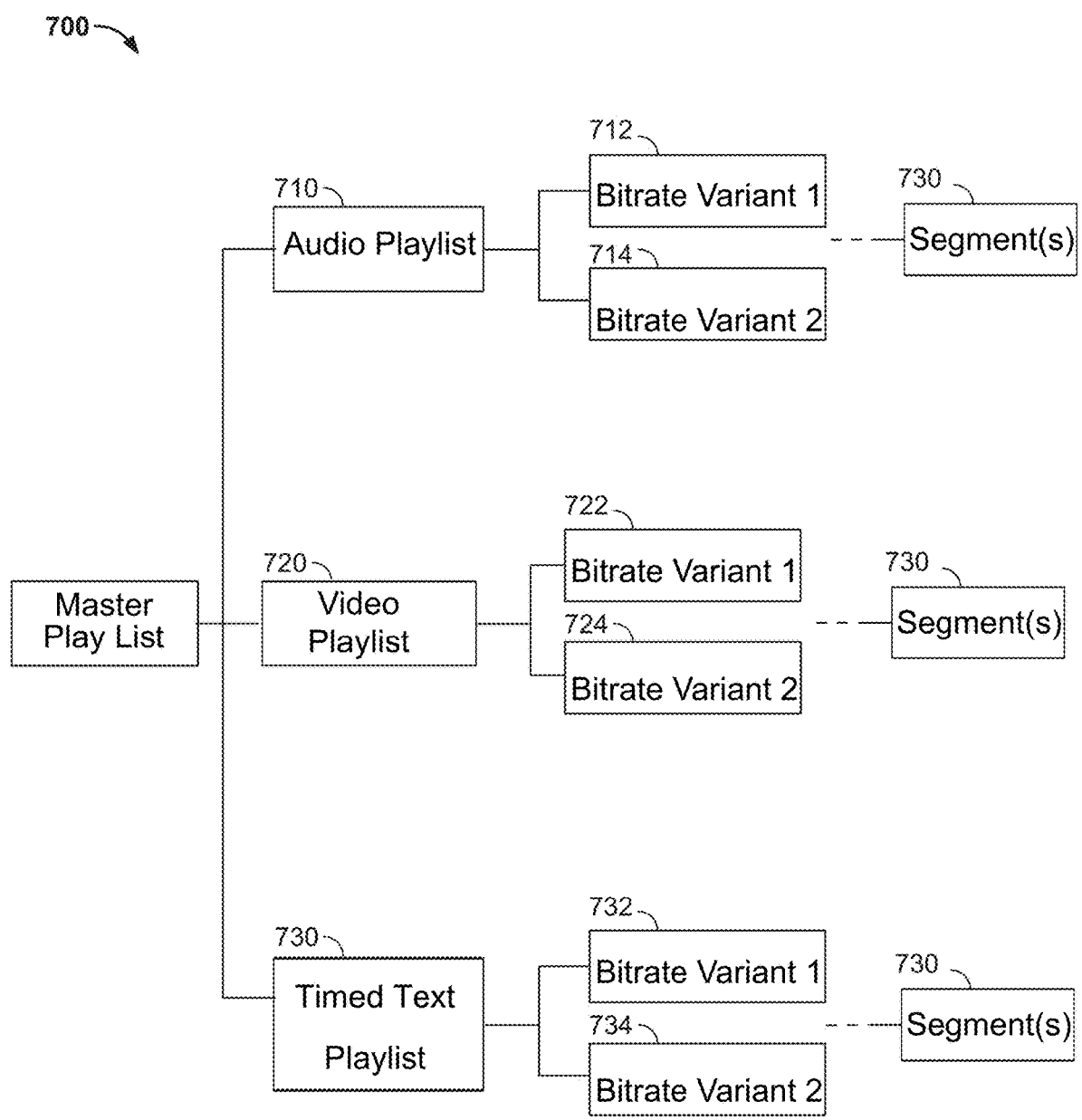
FIG. 7 illustrates an exemplary master playlist comprising a timed text track, in accordance with some examples of the disclosure.

FIG. 7. depicts an exemplary master playlist 700 which comprises an audio playlist 710, video playlist 720, and timed text playlist 730, wherein each of the audio, video and timed text playlists comprise bitrate variants 712-714, 722-724 and 732-734, respectively. The bitrate variants 712-714, 722-724 and 732-734 correspond to a plurality of segments 740. For example, the audio playlist 710 comprises bitrate variants 712 and 714. In some examples, bitrate variant 712 is the highest bitrate variant of the audio playlist 710 and bitrate variant 714 is the lowest bitrate variant of the audio playlist 710. The number of bitrate variants shown is for illustrative purposes only and there may be one or more bitrate variants for each of the audio 710, video 720 and timed text 730 playlists.

The bitrate variants 712-714, 722-724 and 732-734 are encoded with resolutions ranging from, for example, 360p to 2160p and various quality levels using adaptive bitrate streaming compatible codecs and resolutions for adaptive video streaming formats. In some examples, the lowest bitrate variants, are text, hyperlinked text or a still image. For example, a video regarding a certain news story may have a corresponding timed text playlist, with a low bitrate variant, such as static images from a local news source. Each of the bitrate variants is separated by a minimum delta megabit per second (Mbps), for example, 1 Mbps or 2 Mbps.

In some examples, the master playlist 700 is transmitted as a manifest that describes the available stream segments of an adaptive video stream and their respective bitrate variants. In some examples, the timed text data playlist 730 can be consumed on a first device independently of the audio 710 and video 720 playlists.

Therefore, although the master playlist is transmitted with each of the audio 710, video 720 and timed text 730 playlists, a user can consume the data in several different ways. For example, the video playlist 720 can be the next segment of a plurality of segments of an adaptive bitrate stream (e.g., MPEG-DASH, Adobe HTTP Dynamic Streaming, Apple HTTP Live Streaming, Microsoft Smooth Streaming, QuavStreams Adaptive Streaming over HTTP, upLynk or the like).

In some examples, the timed text data within the timed text playlist 730 is consumed on the user's device at the same time as the audio data and the video data within the audio playlist 710 and video playlist 720. For example, the audio, video and timed text data are contained within a segment of a plurality of segments of an adaptive bitrate stream, and the timed text data could be consumed as a picture-in-picture view of the adaptive bitrate stream. In this way, the user can consuming the audio and video data with the timed text data concurrently, on the same device or screen. In some examples, the user can toggle between the audio and video data on the first device to the timed text data.

In some examples, the master playlist 700 is also transmitted to a second network device. This enables a user to consume the audio and video data on the first device and consume the timed text data on a second device. In this way, the user can maintain an uninterrupted viewing experience of the audio and video data on the first device, while consuming the timed text data on the second device. In some examples, the timed text data is consumed on the second client device, and the audio and video data are consumed on the first device concurrently.

On some video platforms, consuming timed text data is mandated based on time stamps of a video data, or after consuming a certain amount of video data. In combination with the current disclosure, in some examples, the user would be able to consume the mandated timed text data in a way that they desire or a way that provides them with their subjective optimal viewing experience. For example, rather than interrupting the audio and video data being consumed on the first device to view a timed text, the user can consume the timed text data as a picture-in-picture with the audio and video data, on a second device, or by toggling between timed text and video data at their leisure. In this way, the user has a better viewing experience of the audio and video data, which is no longer interrupted at the time mandated by the video platform.

In some examples, the audio, video or timed text data described in the playlists 710, 720 and 730, has a magnitude of size from bits to megabits or larger. Therefore, in some examples, based on the available bandwidth, the bitrate variants of the audio playlist 710, video playlist 720 and timed text playlist 730, are intelligently chosen to maximize the available bandwidth of the client device. For example, for a podcast, the video data may have a lower priority than the audio data. However, audio data typically consume much less of the bandwidth available at a client device. Therefore, a timed text bitrate variant can be chosen from the timed text playlist 730 that maximizes the available remaining bandwidth at the client device.

Therefore, in some examples, based on the content of the audio and video data, the timed text bitrate variants 732-734 are chosen to take up more or less of the available bandwidth of the client device.

The timed text playlist 730 may be created at the same time as the audio playlist 710 and video playlist 720, or the timed text playlist 730 may be created after and added to the master playlist 700 at a later time. For example, a video platform provider can add the timed text playlist 730 to the master playlist 700 of content already hosted on the platform, known as legacy content. In other words, the master playlist 700 or manifest of legacy content can be regenerated with the timed text playlist 730 added.

In some examples, the master playlist 700, comprising the audio playlist 710, video playlist 720 and timed text playlist 730, is compatible with legacy media players are that not specifically adapted to receive the timed text playlist 730. For example, the timed text playlist 730 may comprise an identifier, which would cause a legacy media player not to fetch the segments for the timed text data as a part of the adaptive video stream and the master playlist 700 is still able to provide the audio and video data.

Referring back to FIG. 6, additional factors may be considered in determining what level is below the user's current proficiency level for generating for display the first portion of the content item. The factors and examples provided in FIGS. 6 and 7 are only a few examples and the examples are not so limited. Other factors and examples may also be considered in determining what level is below the user's current proficiency level and rewrite the timed text file. For example, language proficiency can also be determined from a user's interactions with a virtual assistant (e.g., Siri, Alexa, etc.). The data obtained can be fed into the machine learning algorithm and that can be part of assigning a language proficiency value to a profile and then used for summarizing timed texted words and phrases.

The information obtained through virtual assistants can be shared with respective video or content item services and service providers (e.g., Siri information while watching content on iOS or Apple TV; Alexa info can be used while watching content within Prime Video, Netflix, Comcast etc.). (Netflix is a trademark owned by Netflix Inc., Alexa and Prime Video are Amazon Prime are trademarks owned by Amazon Technologies, Inc, and iOS and Apple TV are Amazon Prime is a trademark owned by Apple Inc.).

Referring back to step 310 of FIG. 3, once the language proficiency level and user preferences are obtained the methods and factors described in FIGS. 5A, 5B, and 6 are used in determining which audio, words, phrases, and sentences to generate for display the first portion of the content item at a level below the user's proficiency level. In addition, the methods and factors are used in determining which audio, words, phrases, and sentences to replace from the timed text file to rewrite the displayed text such that it is personalized to the user and the number of words is reduced such that the user is able to read at their pace within the time frame when the associated video segment of the content item is being displayed.

Figure 8:
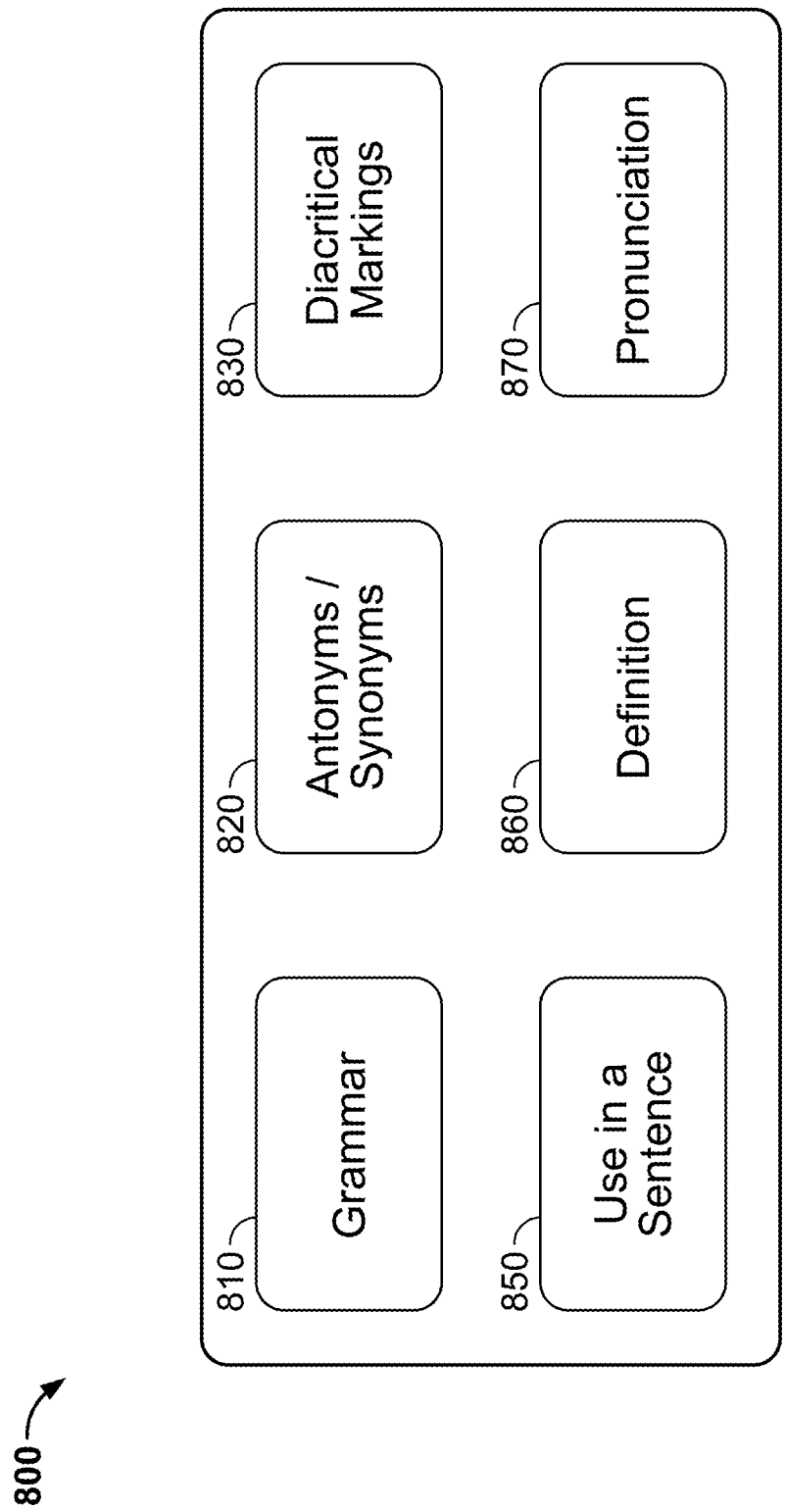
FIG. 8 is a block diagram of types of metadata categories, in accordance with some examples of the disclosure.

Some examples of the word and sentence summarization were depicted in FIG. 6. FIG. 8 is a block diagram of types of metadata that may be contained within the timed text file for additional information that can be provided to the user to supplement the user's learning of the second language, in accordance with some examples of the disclosure. These categories include grammar 810, antonyms/synonyms 820, diacritical markings 830, use in a sentence 850, definitions 860, and pronunciation 870.

In addition, metadata may include abbreviations, such as "BRB" for "Be right back," "IMO" for "In my opinion," "OMG" for "Oh my God." Abbreviations may also be common business or industry used terms like "CEO" for "Chief executive officer," "ACL" for "Access control list," or "IP" for "Internet Protocol." In other examples, money or currency discussions may be summarized by a monetary sign that is relevant at the location of the user, such as "$" for U.S. Dollar sign is the user is located in the United States, a "£" for British Pound if the user is located in the United Kingdom, and a ""₹"" sign representing an Indian Rupee if the user is located in India. In particular, if the user has a low proficiency level in the secondary language, explicitly saying "US Dollars," "GB Pounds," or "IN Rupees" may not be required to convey the message of the timed text or may save time in reading by removing such terms. Likewise, a sign for a measure of weight may also be represented by either the metric system (e.g., kg for Kilogram) or the U.S. Customary system (e.g., lbs. for pounds).

Diacritical markings 830 includes diacritics (also known as diacritical marks, diacritical points, diacritical signs, or accents), which are glyph added to a letter or a basic glyph. A diacritical mark is a symbol that tells a reader how to pronounce a particular word—in regard to accent, tone, or stress—as well as meaning, especially when a homograph exists without the marked letter or letters. For example, pâthe refers to clay whereas pate refers to the head, and résumé or resumé is used for a work history versus resume, which means "to begin again."

Synonyms such as automobile, car and vehicle, which contextually may mean nearly as same as each other but have different levels of language proficiency associated with them, may also be used. Likewise, antonyms may also be used. For example, a common turn of phrase in English is "he is not happy" which when translated may not make much sense to a user learning a second language if that user has a low proficiency level. Accordingly, an antonym may be used to convey the same sentiment, for example, "il est triste" which is French for "he is sad".

Other synonyms include words in the form used locally in the country of the user. For example, "gasoline" may be referred to as "petrol" in some countries and an "elevator" may be referred to as a "lift." The machine learning algorithm would determine, based on at least some of the factors mentioned in FIG. 6 that the user resides in a certain country and as such adjust the summarization to use words that are more common in the country of residence.

In addition to regional adjustment, natural language processing (NLP) may be applied to determine the context and linguistic meaning of a timed text such that a suitable summarized word can be used to replace the timed text. For example, if the timed texted text is "pound," then NLP may be applied to determine whether it is associated with a measure of weight "lbs" or a measure of currency, such as the British pound "£." As such, NLP may analyze other words, phrases, and sentences associated with the word pound to determine whether the pound is related to a measure of weight or currency.

The metadata may also comprise information about the use of words in the portion of the content item based on their use in a sentence 850. This may be particularly relevant for languages with gender base pronouns for different words. For instance, returning to the example of jouer, to play in French, the preposition required for this verb may be à or de, depending on the activity: jouer à+game or sport; jouer de+music and musical instruments.

The metadata may also comprise definitions 860 of the words selected or in the portion of the content item. For example, a user may select the phrase, je cours, which causes the system to perform a look-up in a dictionary for the definition of the phrase which is I run. In some examples, different applications of the French verb conjugator, courir, and how to use the verb in the present, future, imperfect, present participle, subjunctive, conditional, passé simple, imperfect subjunctive, and/or imperative are also provided.

Determining what level is below the user's current proficiency level for generating for display the first portion of the content item, or rewriting the timed text file comprising sentences, phrases, or words may vary depending on the determined user's proficiency level of the secondary language. For example, as described earlier through the discussion of FIGS. 5A and 5B, the level of language proficiency may vary from 1-10 or a beginner to an expert and as such the grammar, synonyms, antonyms, summarizations based on locations, icons, and emoticons may also vary in the degree to match the language proficiency of the user.

Figure 9:
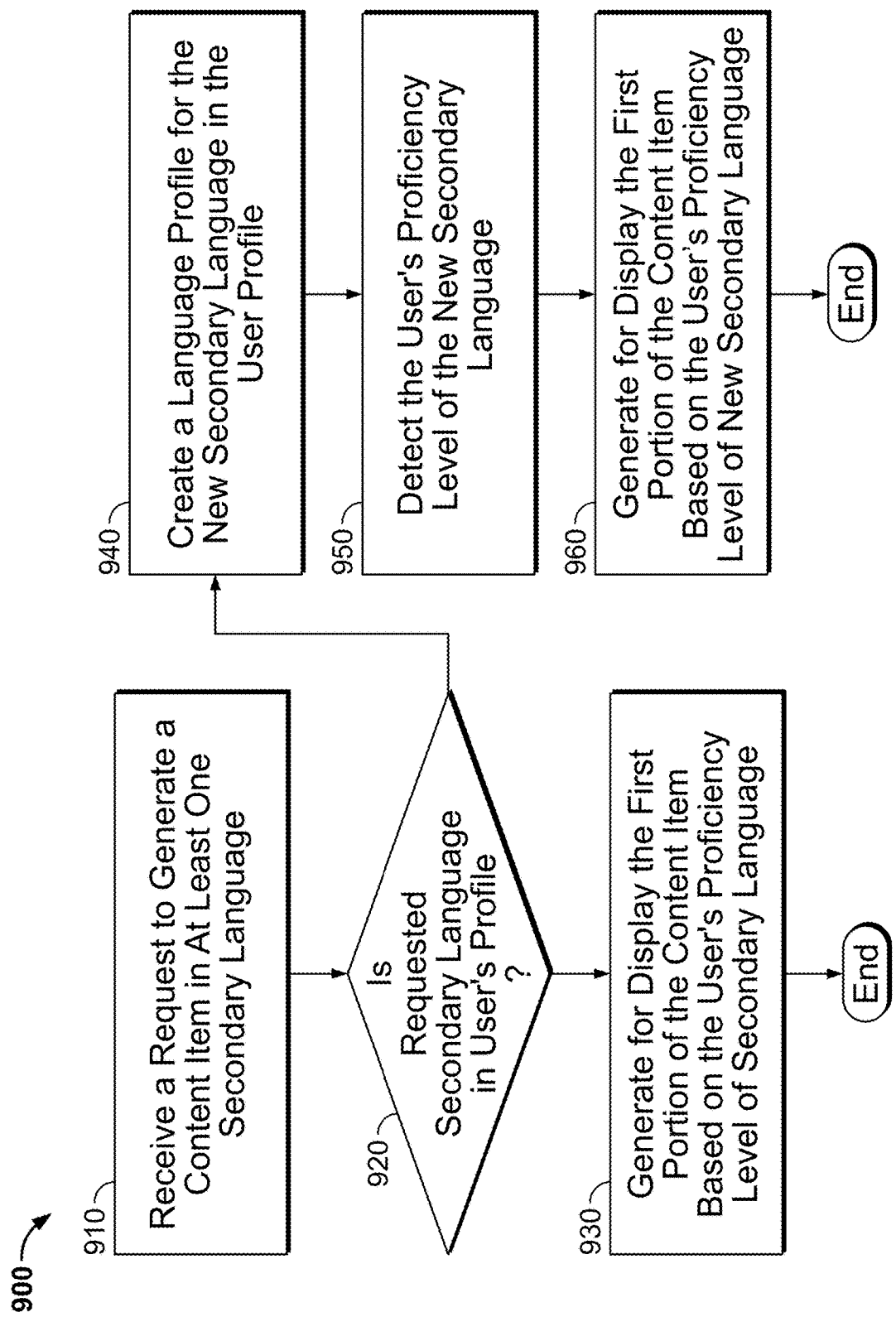
FIG. 9 is a flowchart of a process for creating a new secondary language profile in a user profile, in accordance with some examples of the disclosure.

FIG. 9 is a flowchart of a process for creating a new secondary language profile in a user profile, in accordance with some examples of the disclosure. Process 900 may be used and implemented through systems and devices as described in FIGS. 1-2 to generate for display the first portion of a content item based on the user's proficiency level in the secondary language, or in some cases detect the user's proficiency level of a new secondary language prior to generating the first portion of the content item.

At step 910, the system receives a request to generate a content item in at least one secondary language. At step 920, the system determines if the requested secondary language is in the user's profile or not. If the answer to step 920 is yes, then process 900 moves on to step 930. At step 930, the system generates for display the first portion of the content item based on the user's proficiency level in the secondary language. In some examples, step 930 of process 900 is replaced by step 330 of process 300.

If the answer to step 920 is no, then process 900 moves on to step 940. At step 940, the system creates a language profile for the new secondary language in the user profile. At step 950, the system detects the user's proficiency level of the new secondary language. The user's proficiency level in the new secondary language is detected or determined as described in earlier figures the pace and language proficiency can be determined based on a plurality of factors. In one example, the system may also generate a sample test to determine the user's comprehension, understanding, pace and language proficiency level.

At step 960, the system generates for display the first portion of the content item based on the user's proficiency level of the new secondary language. In some examples, step 960 of process 900 is replaced by step 330 of process 300.

Figure 10:
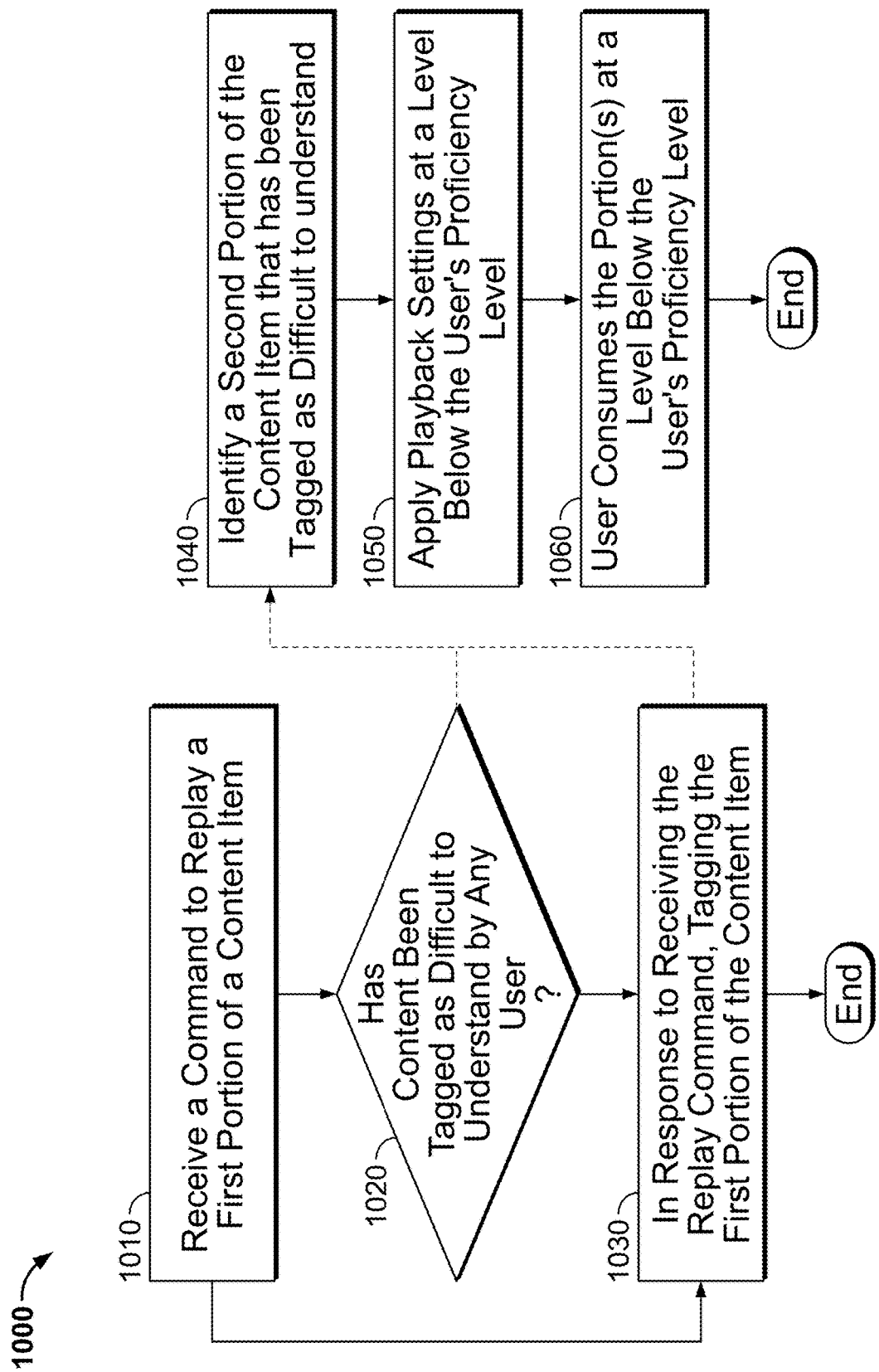
FIG. 10 is a flowchart of a process for tagging a content item as difficult to understand, in accordance with some examples of the disclosure.

FIG. 10 is a flowchart of a process for tagging a content item as difficult to understand, in accordance with some examples of the disclosure. Process 1000 may be used and implemented throughout systems and devices as described in FIGS. 1-2. Process 1000 may be deployed if a timed text file instructs the media player to perform process 1000, or the user's device may carry out process 1000 upon instruction or in response to the user's replay request.

At step 1010, the system receives a command to replay the first portion of a content item. In some examples, the replay or rewind command may be received in response to the user making a selection on their remote control or touch screen that corresponds with a rewind operation. In some examples, the system may associate multiple commands to replay or rewind a portion of a content item, or even a single rewind, with the user wanting to reread the timed text file that exceeds a threshold limit and cannot be read within the time frame of the associated video frames being depicted, or may be struggling to understand the content based on proficiency level. In another example, the system may also associate a pause selection as indicative of a user requiring more time to read the timed texted text presented on the display screen of the media device.

In any regard, as process 1000 continues, the system determines if the current portion of the content item has been tagged as difficult to understand or not, by any users. In some examples, the tag may be present in the timed text file or the master playlist. In other examples, an indication of the content potentially being difficult to understand is stored in a storage and retrieved by the system.

If the answer to step 1020 is no, then process 1000 continues on to step 1030. At step 1030, the system tags the first portion of the content item as potentially difficult to understand. In some examples, the proficiency level of the user is also associated with the flag so that future systems can use that data to determine if any changes are needed for a particular user. For example, if the present user has a low proficiency level, and finds the first portion of the content item difficult to understand, a future user of a similar or same level may also find the first portion difficult to understand. However, a different user with a higher proficiency level may not find the first portion difficult to understand.

After step 1030, process 1000 may end. However, it is equally possible that process 1000 may move on to process 900, continue with parts of process 300, and/or continue to step 1040, as will be described in more detail below. To be clear, it is considered within the scope of the present disclosure that process 1000, 900, 300, or a combination thereof may be performed in parallel, or with steps changed or included in different processes. Processes 300, 900, and 1000 are shown and describe herein for simplicity.

In some examples, the system also determines if the number of replay commands, rewinds, or pauses, exceeds a threshold. The threshold may be predetermined by the system or the user and used in determining if the first portion of the content item should be tagged and associated with the user requiring more reading time to read the timed texted text. The threshold may be 2 rewinds or 3 rewinds, or pauses, or a number that is predetermined. In this way, pauses for other reasons can be accounted for. In some examples, the threshold may apply to one or more users.

In response to step 1020 being yes, process 1000 continues to step 1040. At step 1040, the system identifies a second portion of the content item that has been tagged as difficult. For example, as the present portion may also be a segment of a few frames or seconds of a multimedia content item, likely, a next or future portion will also be flagged as difficult to understand. In this way, step 1050 can be applied to a plurality of portions of the content item.

At step 1050, playback settings at a level below the user's proficiency level are applied to the portion, or portions, of the content item. For example, the first or second portion may be replayed at a slower playback speed, turn closed captions on, turn subtitles on, change the audio language from the secondary language to a primary language, change the language of the subtitles, or the like.

For instance, the content item playback speed may be reduced to a speed based on the user's language proficiency. For example, the system may slow down the playback speed of the associated set of frames (e.g., from normal speed to 0.75×, or a lower number), as the user already has a high proficiency level and such an adjustment is adequate for the user to understand the portion(s) of the content item.

In another example, as shown in FIG. 11, the timed text file can be rewritten such that only the spoken sounds, such as speech or dialog, would be generated for display. Non-spoken sounds would not be generated and removed from the timed text. This provides an easier way to read a timed text file (e.g., subtitles) that has the same message as the original timed texts, but with more time for the user to read.

Returning to FIG. 10, after the playback settings have been determined and applied, at step 1060 the user consumes the portion(s) at a level below the user's proficiency level of the secondary language.

As depicted in FIG. 11, the original closed captions from the original timed text file 1110 describe the captions to be generated irrespective of a user's proficiency level of the chosen language. The assumption is always the user can read the content of the timed text file, as provided in the first instance. As such, the time text file contains the following dialog: "He communicated to me that he will be right back with the information." It also contains caption information that identifies the background music, which is "Frank Sinatra song New York New York" that is playing in the background.

As being processed by, for example, process 1000, the timed text file has been rewritten into the lower proficiency level file 1120. As shown in FIG. 11 the background music caption information and the traffic noise description has been removed. In addition, the dialog has been expanded over the 3 lines of text, to provide less content for the user to read, and more time for the user to read it in. The system can detect which timed texts are related to speech and which timed texts are related to background sounds or other caption information. Thus, the lower proficiency level file 1120 presents an easier form of timed texts such that the user can read them quickly and more easily.

Figure 12:
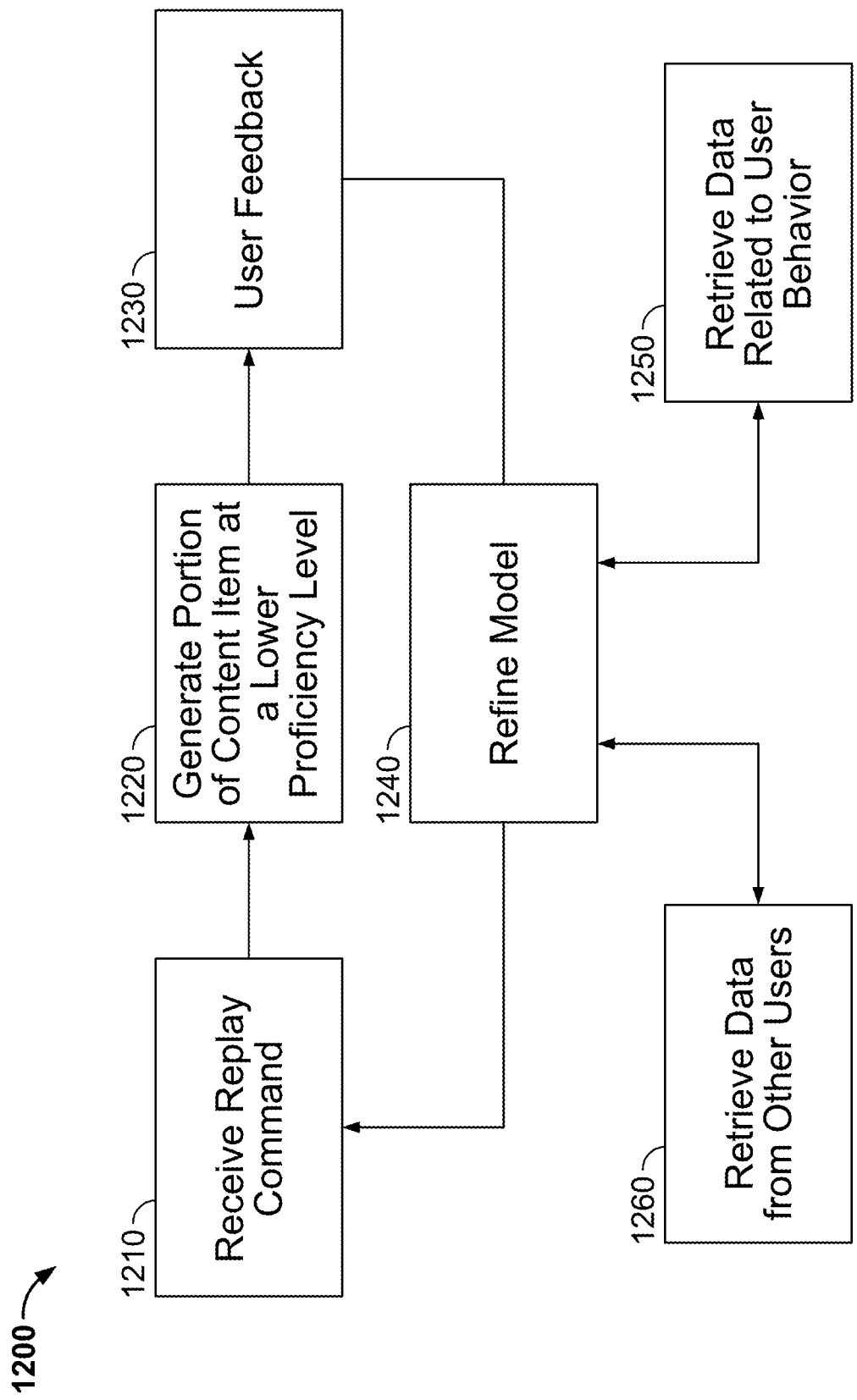
FIG. 12 is a flowchart of a process for training and refining a machine learning algorithm that can be used for replaying content at a level below the user's proficiency level, in accordance with some examples of the disclosure.

FIG. 12 is a flowchart of a process 1200 for training and refining a machine learning algorithm that can be used for generating a portion of a content item at a lower proficiency level, in accordance with some examples of the disclosure. The machine learning algorithm can be applied to receive feedback on determining what level is below the user's current proficiency level and refine the model accordingly. When applied, the machine learning algorithm analyzes a word, phrase, or sentence to be generated based on the user's historical data gathered over time. It may also analyze the word, phrase, or sentence to be generated based on other factors such as data from other users, such as crowdsourced data from other individuals that have the same or similar proficiency level as the user.

In one example, training and refining the machine learning begins at step 1210, where a replay command is received. Once the replay command is received the first portion of a content item is generated at a lower proficiency level at step 1220. The generation, for example, can be performed by abbreviating a word, using synonyms or antonyms, using words or phrases previously used by the user, or use any of the summarizing options as described in the discussion of FIGS. 6 and 8.

At step 1230, the system receives feedback from a user relating to the summarized text. In one example, a server may transmit a command to generate a user interface that can be used for approving or rejecting words, phrases, and sentences generated for the portion of the content item.

The machine algorithm at step 1240 uses the user feedback from step 1230 to train and enhance the algorithm such that future generates of a portion of a content item is performed based on the feedback received from the user. For example, the machine learning algorithm may generate the next portion of the content item based on feedback provided on the previous portion of the content item.

In another example, the machine learning algorithm may retrieve data related to user behavior data at step 1250 and/or retrieve data from other users to further train and refine the machine learning algorithm. For example, at step 1250, the system may be authorized and provided access to all or some of the user's online accounts and electronic devices. The system may also be provided access to servers, routers, and local hubs used by the user. Data relating to user's online interactions and electronic communications may be obtained by the system and fed into the machine learning algorithm. Some examples of data sources from which data can be retrieved to determine behavior are further described in the description associated with FIGS. 6 and 16. The machine learning algorithm may use additional tools, such as artificial intelligence tools, to analyze user behavior based on the user data obtained.

The results from the analysis may then be used to determine user preferences, user language proficiency, and develop a personalized user dictionary that can be stored in a database. Words, phrases, sentences, grammar, abbreviations, language usage from the personalized dictionary may then be used to provide a timed text that is personalized to the user's specific needs.

At step 1260, the system may also retrieve data from other users, such as family members, friends in a social circle, or other individuals identified by the user. For example, the user, using the user interface, may identify their spouse or another family member as having same similar language proficiency and allow the system to use the family member's behavioral history and summarize timed texted text based on the family member's proficiency level.

The system may also crowdsource data from a particular group and data from the particular group may be used in training and refining the machine learning algorithm. For example, in one use case, the system may identify a co-worker at a company as a specific group and use technical terms used commonly in the group for summarizing timed texts relating to a work-related educational training content item.

Figure 13:
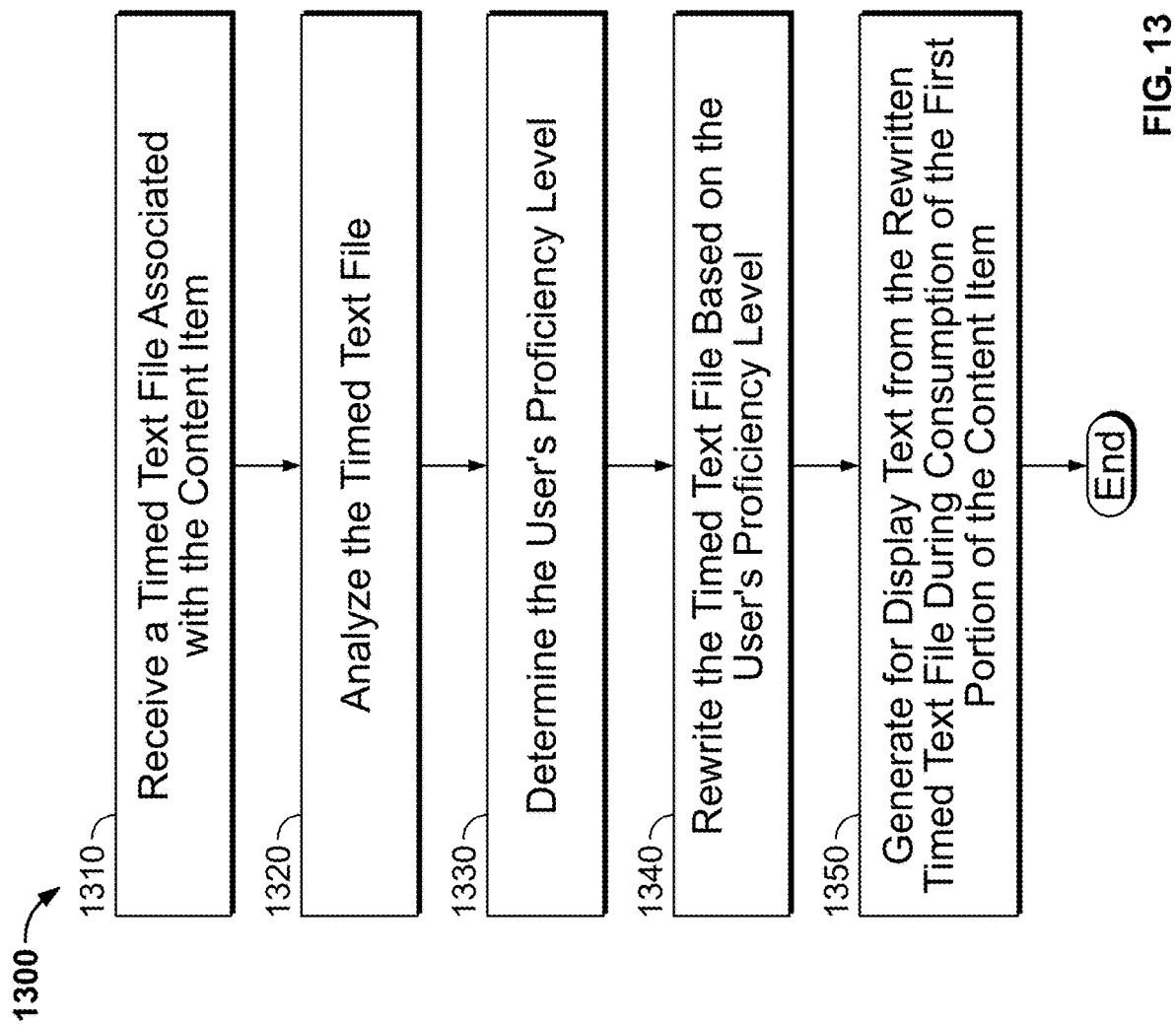
FIG. 13 is a flowchart of a process for rewriting the timed text file, in accordance with some examples of the disclosure.

FIG. 13 is a flowchart of process 1300 for rewriting the timed text file, in accordance with some examples of the disclosure. The systems and methods used in the description of FIGS. 1-12 may also be applied when rewriting a timed text file.

In one example, a timed text file may be rewritten, and reference by the manifest file, based on the user's language proficiency level of the secondary language. The timed text file may be rewritten before, during, or after the content item is viewed (e.g., for the next user). It may also be rewritten when a content item is placed into a user playlist or queued for viewing.

For example, the timed text file may be rewritten prior to the viewing of the content item. A user may select the content item to watch or may schedule a time to watch the content item at a future time. The system may receive the user's indication to watch the content item and use the methods and tools described above to rewrite the timed text file before the content item is played back.

The timed text file may also be rewritten after the user has selected the content item to be played and during the earlier portions of the content item or anytime during the playback. For example, the system may determine to rewrite the timed text file while the initial credits are being played back or during the starting few minutes of the content item. The timed text file may also be rewritten after the user has viewed a content item such that timed texts are summarized for future viewing of the same content item. For example, a family member may determine after watching a content item that another family member whose language proficiency and reading pace is different from the user can benefit from the rewritten timed text file.

The timed text file may be automatically rewritten based on receiving an indication that the user is currently consuming the content item or will be consuming the content item at a future scheduled time. It may also be rewritten when a user may select options using the user interface to initiate such rewriting. In another example, the system may predict what the user is likely to watch and automatically rewrite the timed text file. For example, if the user is watching a series and has watched a threshold number of episodes of the same series, then the system would predict that the user is likely to watch additional episodes of the same series and automatically rewrite the files for the unwatched episodes. In another example, if the user has consumed an episode or a movie that has additional sequels, then the system may automatically rewrite the timed text files for all the remaining episodes and sequels since it is likely that the user may watch them later.

The system may also determine based on the user's electronic communications of online activity that the user is likely to watch a particular content item and automatically rewrite the file before the playback of the content item. For example, since the system is granted access to the user's electronic communications and online activity, a message from the user, such as a text or a posting on a social media channel, where the user expresses an interest in watching a content item may be obtained by the system and used as a trigger to rewrite the timed text file before its playback.

In one exemplary process, the rewriting of the timed text file begins at step 1310. At step 1310, a timed text file associated with a content item is received. At step 1320, the timed text file is analyzed by the system. The analysis includes, for example, determining the number of words for each frame in context with whether the number of words exceeds a threshold limit for its associated frame or plurality of frames. For example, if the number of words timed texts for the associated frame requires an average user 6 seconds to read them, and the frame duration based on its start and end time is 4 seconds, then the system determines that the number of words exceed the threshold and cannot be read within the display of the associated video frame, based on the user's proficiency level. As such, the system may determine that the timed texted text is to be rewritten such that it can be ready within the time frame of the associated video frame being displayed, i.e., within 4 seconds.

At step 1330, the system determines the language proficiency of the user. In some examples, the system also determines the user's preferences. As described in the discussion of FIGS. 5-9, various methods may be applied and factors considered to determine the user's language proficiency, reading pace, and preferences. The system may also use machine learning and artificial intelligence tools and algorithms to determine user behavior and use data based on user behavior to determine user's language proficiency, reading pace, and preferences.

In one example, the system may generate a sample test and display the test on a user interface to evaluate the user's language proficiency level and reading pace. The test may include a variety of words, phrases, sentences, sentence structures, grammatical structures, abbreviations, symbols, emoticons, and other combinations of characters. The test may be timed to determine whether the user can read the provided timed texts within the allotted timeframe. A survey at the end of the test may also be used to obtain user feedback on the terms used in the test. The user's language proficiency level and reading pace may be assigned based on the results of the test and/or the survey and other feedback.

As described earlier, the system may also generate a personalized dictionary that is specific to the user than can be used in rewriting the timed text file. The personalized dictionary may be a set of words, phrases, sentences and other characters that are familiar to the user based on prior history or selected based on the language proficiency of the user.

At step 1340, the system may rewrite the timed text file based on the user's language proficiency level. In some examples, the timed text file is also rewritten based on the user's preferences. Once rewritten, the rewritten timed text file may consist of terms (words, phrases, sentences, icons, and other graphics) that are customized to the user.

The rewritten timed text file may be stored in a database and associated with the content item. In one example the system may replace the original timed text file with the written timed text file and in another example, the system may store both files and allow the user to multiplex and switch between files, or use some combination thereof, as needed. At step 1350, the system generates for display text from the rewritten timed text file during consumption of the first portion of the content item.

FIGS. 14 and 15 are exemplary portions of timed text files, in accordance with some examples of the disclosure. As depicted in FIG. 15, the timed text file includes a start and end time of a video frame, e.g., "begin='0.76 s' end='3.45 s.'" The dialog associated with the video frame is: "It seems a paradox, does it not." The dialog is displayed within the 0.76 to 3.45 seconds time frame while the associated video frame is displayed.

Figure 16:
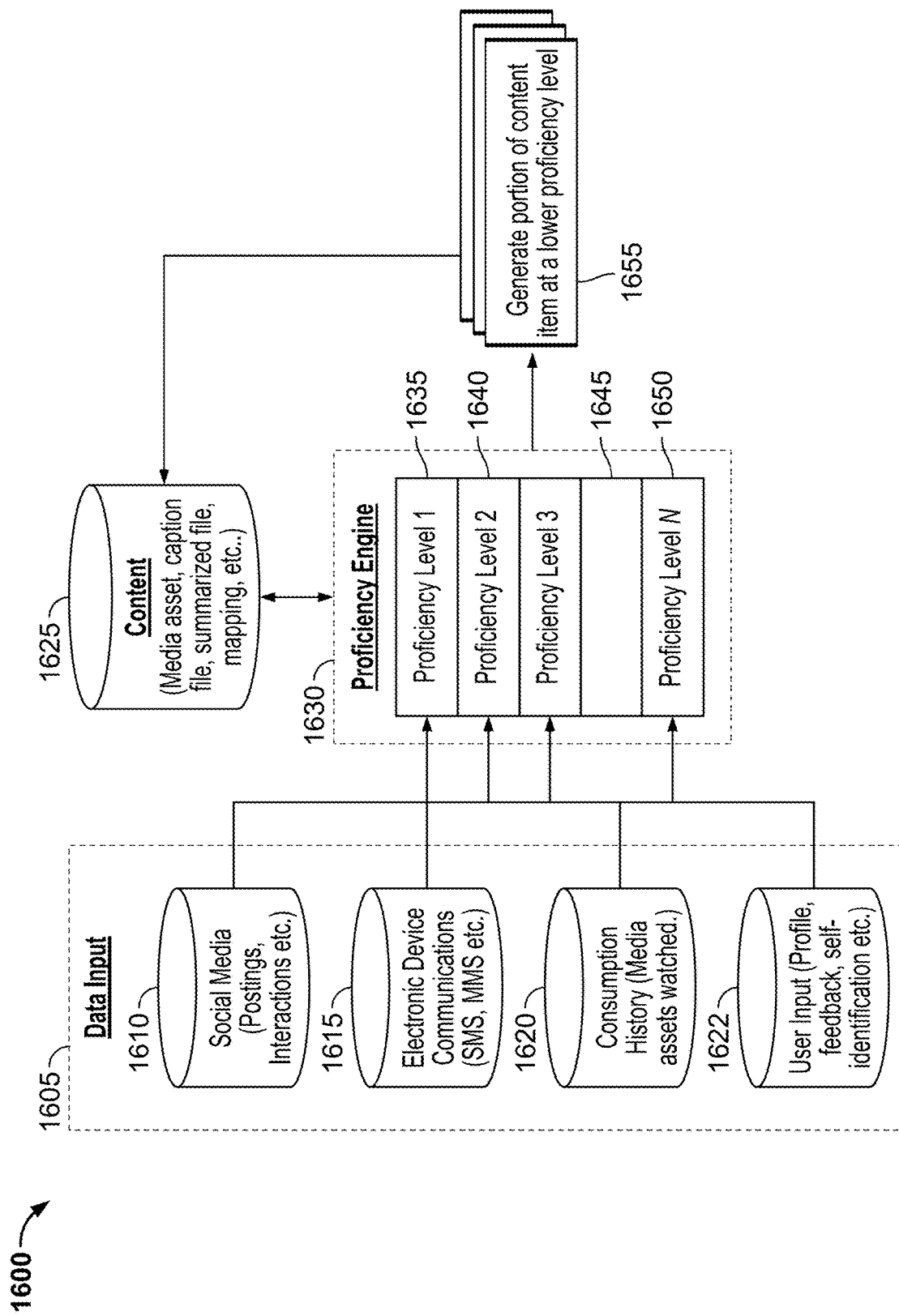
FIG. 16 is a diagram of information flow into a proficiency engine to generate a summarized term, in accordance with some examples of the disclosure.

Other audible noises, such as tires screeching and people screaming, shotgun blasts, as depicted in FIG. 16, may also be included in the timed text file. Some video frames may include a larger number of timed texted words, such as in FIG. 16 lines 2 and 4 while other video frames may include a lesser number of words, such as in FIG. 16 line 3. Since speech and audible sounds are associated with a particular scene displayed through a single or plurality of video frames, the system may rewrite such timed text files based on the user's language proficiency, reading pace, and preferences so its user friendly and can be ready within the time frame of the associated video frame being displayed.

FIG. 16 is a diagram of information flow into a proficiency engine to determine a user's language proficiency level. The input to the information flow is from sources 1610-1622, and other sources described in FIG. 6. Terms from the sources are used to determine a language proficiency level and the language proficiency level is used to determine the generated portion of the first content item at a lower proficiency level. The terms from the sources may be words, phrases, sentences, and other forms of word/sentence structures.

In process 1600, the proficiency engine inputs 1610-1622 include social media inputs 1610 and terms associated with the user's interactions on social media. For example, these terms are posting made by the user on social media platforms, including the user's response to messages, posts, comments, and their postings.

The proficiency engine input also includes electronic device communications inputs 1615. These inputs may include communications of the user using electronic devices associated or owned by the user. For example, the user may be associated with a mobile phone, a tablet, a gaming device, a remote control, a laptop computer, or another type of electronic communication device. The inputs from the devices may be SMS and MMS texts, postings, messages, emails etc.

The proficiency engine input also includes consumption history inputs 1620. These inputs may include comments made in reference to the consumption of content items. The inputs may also include approval of rewritten timed text files from previously watched content items.

The proficiency engine input also includes user inputs 1622. These inputs may include the user's profile that has been populated by the user, the user's self-identification of a language proficiency level, or user feedback on approval or rejection of previous timed text files.

The proficiency engine inputs 1605 are analyzed by the proficiency engine 1630, along with content 1625. The content 1625, which is a timed text file containing a set of timed texts, may be obtained from content source 112 in FIG. 1.

The proficiency engine 1630 may receive and analyze inputs 1605 in several ways. In some examples, proficiency engine 1630 uses inputs 1605 to determine language proficiency level 1635-1650. In one example one of the inputs may be used to determine a language proficiency level and, in another example, a weighted combination of inputs from all input sources 1610-1622 may be used to determine the language proficiency level.

In one example, a language proficiency level is determined based on the type of terms previously used, such as by analyzing inputs 1610-1622 and blocks represented in FIG. 6. For example, if 1615 is used as an input, and artificial intelligence (AI) algorithm is used to determine the user's level of proficiency with the language used in the timed text file. For example, the language may be English, Hindi, Spanish, French, Arabic, or a dialect of a specific language. The user's proficiency level is determined for the language that is used in the timed text file.

Input 1615 is analyzed for the language of the timed text file by determining the type of words, phrases, sentence, grammar, sentence structures, abbreviations, and other terms, such as those described in FIG. 8, are used by the user, such as, when the user is texting using their mobile phone. The AI algorithm analyzes such terms used and places them into different language proficiency levels. The levels may be different word usages of the same term. For example, the word "truthfulness," "candor," "trustworthiness," "honesty," "honest," and "trust" may all be used in the same context, however, the level of complexity, number of alphabets used in each word, the grammatical use of the word, the construction of the sentence structure, and abbreviations used, for example, may all be factored for determining a language proficiency level based on the word, phrase, and sentence usage by the user. As such, each language proficiency level may use a variant of the same term, but with different complexity, a different number of alphabets used. Once a language proficiency level is determined by the proficiency engine 1630, the timed text file is analyzed in light of the language proficiency level to determine a suitable term that can replace or reword the terms used in the timed text file.

The proficiency engine may output a command to generate a portion of the content item at a lower proficiency level 1655 for the timed text term received from the content 1625 input. As described earlier, the proficiency engine 1630 may analyze the timed text term, or set of timed text terms, and determine whether the timed text is to be replaced, and if so, which summarized term should be used to replace the timed text term based on the user's language proficiency level.

The command output to generate the portion of the content item 1655 may be stored in a database associated with the content 1625. In one example, a library of predetermined actions, such as reducing playback speed or removing non-dialog text from the timed text file, may be generated and stored with the content 1625 such that a timed text can be analyzed and rewritten in response to a command to replay the first portion of a content item. The command may also be used to rewrite the entire timed text file, such as when a content item is selected, scheduled for display, or placed in a playlist. In one example, the proficiency engine may analyze each term of the timed text file.

Figure 17:
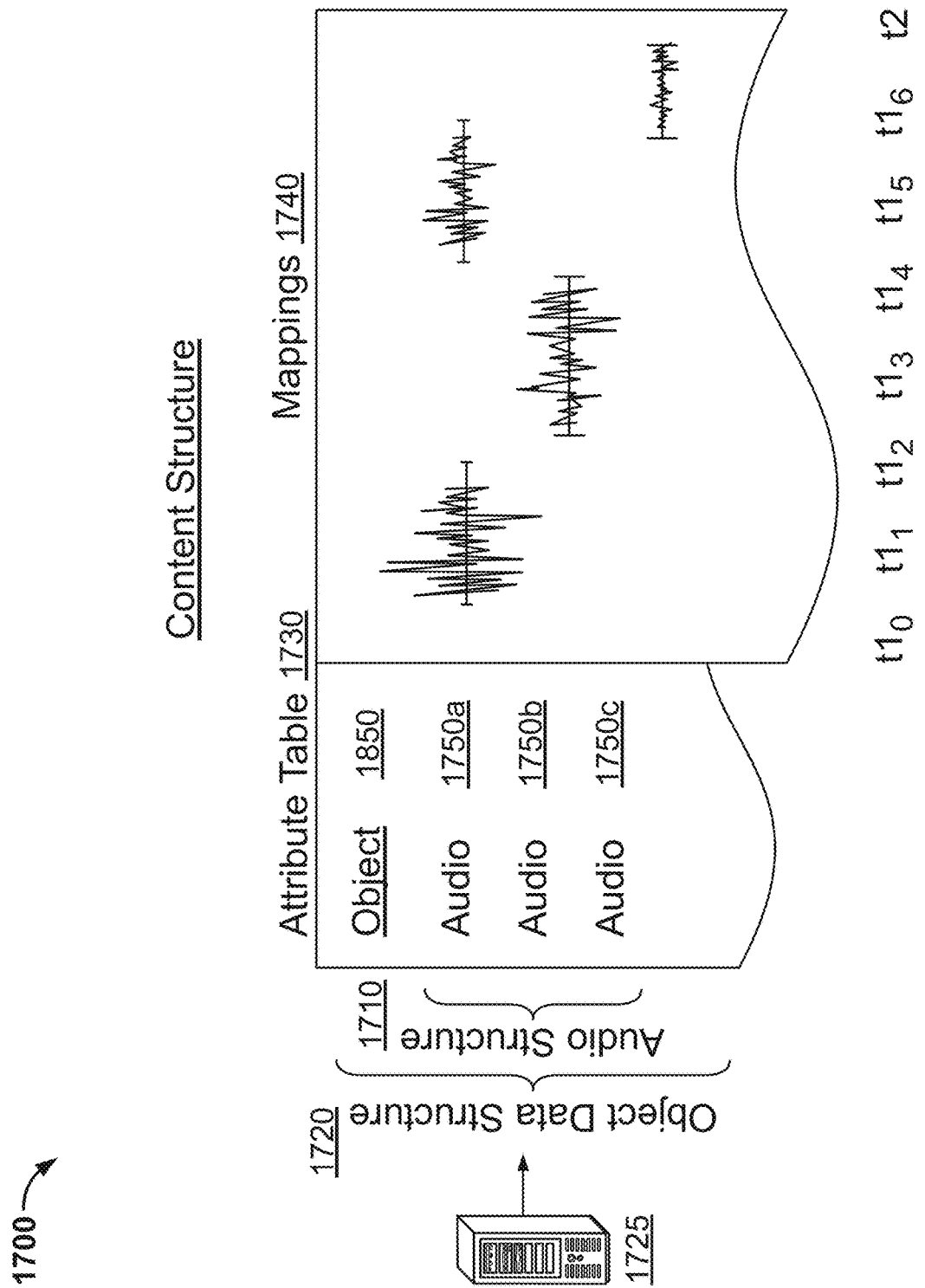
FIG. 17 is an exemplary structure of a content item over a course of time t1 to t2, in accordance with some examples of the disclosure.

FIG. 17 is an exemplary content structure for a video frame over a course of time t1 to t2, in accordance with some examples of the disclosure. The content structure 1700 includes an attribute table 1730 generated from the video frame of the content item. The content structure 1700 also includes a mapping 1740 for each object in the attribute table 1730. The audio structure 1710, which is part of the object data structure 1720 that contains video mapping and other mappings of the video frame of the content item, contains audio information generated by or associated with an object.

In one example, the audio track 1750a may represent dialogue spoken by the object; audio track 1750b represents the sound of music playing in the background; and audio track 1750c may represent traffic noises coming from a window shown in the video framer. Each audio track 1750a-c may further list attributes including audio type, frequency, pitch, melody, volume, lyrics, instrument, voice signature, etc.

Referring back to FIG. 16, the proficiency engine may analyze objects 1750a-c in the attribute table 1730 and their associated mappings 1740. The analysis may be performed to determine which object is to be altered, changed, rewritten, or amended to create a portion of the content at a level below the user's proficiency level. In one example, the proficiency engine may change all objects 1750a-c and in another example, the proficiency engine may select an object to change and not change all objects. For example, the proficiency engine may not want to change non-speech or dialogs objects, such as object 1750b, which is related to background music, and 1750c, which relates to traffic noise such that a summarized version is not cluttered with non-spoken objects.

In one example, if object 1750a is selected, the proficiency engine may then look up an alternate audio object to replace object 1750a with. In some examples, metadata can be found to describe the object 1750a based on the user's language proficiency level.

Figure 18:
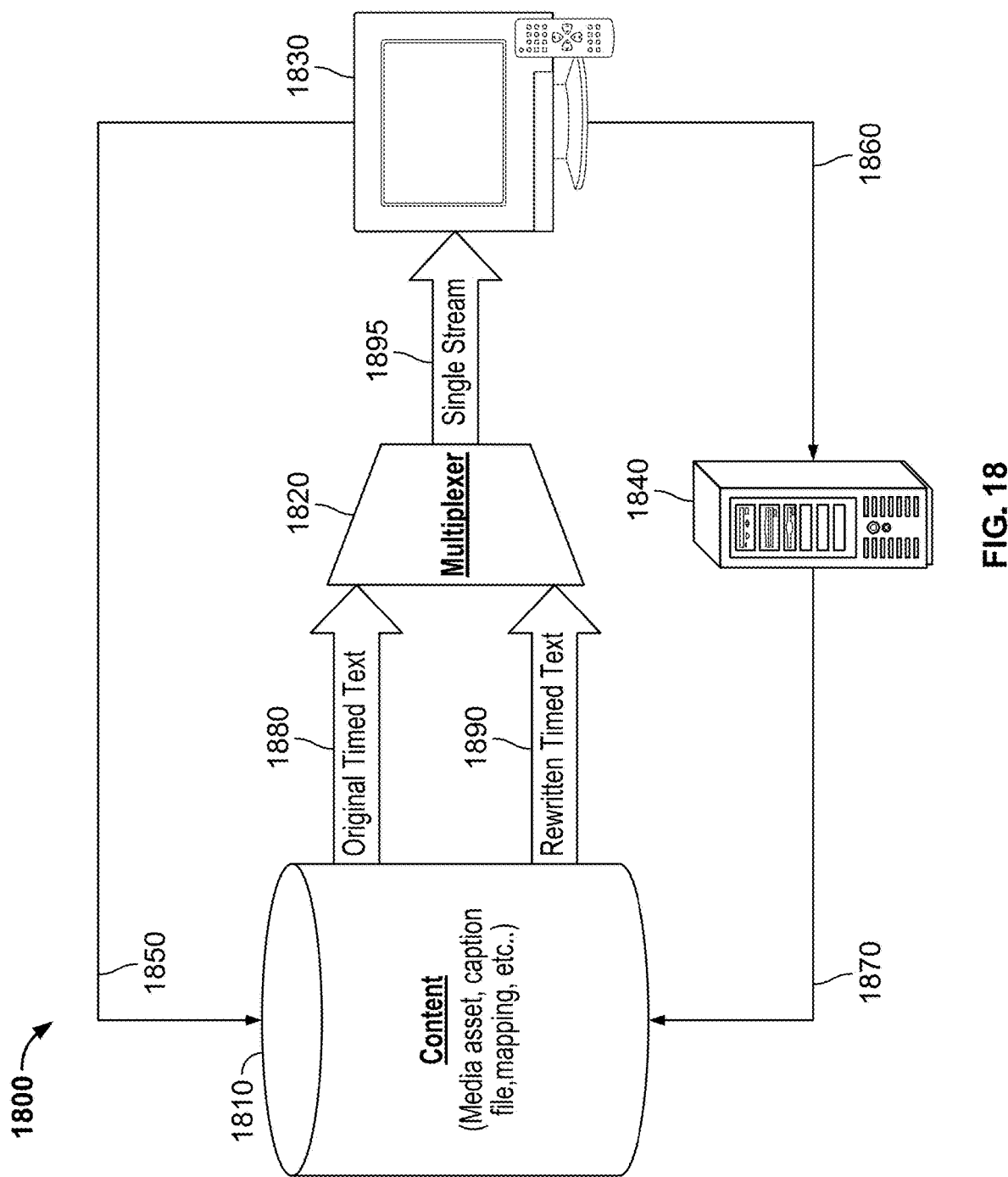
FIG. 18 is a flow diagram for multiplexing between different types of timed text streams, in accordance with some examples of the disclosure.

FIG. 18 is a flow diagram for multiplexing between different types of timed text streams, in accordance with some examples of the disclosure. The system in FIG. 18 includes a content database 1810, a multiplexer 1820, a media device 1830 having a user interface, and one or more servers 1840. The system 1800 may provide for delivering the original content, using the rewritten timed text file. The timed text file may be sent along with the content item or separately as a "sidecar" file to the media device.

The content provider may obtain the original timed text file or the rewritten timed text file from its database 1810. It may then unicast or broadcast the content item along with a selected timed text file to a media device 1830. In one example, the selection of the timed text file may be in response to a request 1850 received from the media device 1830. In another example, it may be in response to a request received either directly from a system server 1840 or the media device 1830 through the system server 1840. The request may be for an original timed text file or a rewritten timed text file on a frame-by-frame basis.

A multiplexer may select the original timed text file, a rewritten timed text file, a combination thereof, or summarized terms for certain portions of the content item on a frame-by-frame, segment-by-segment, scene-by-scene, or portion-by-portion basis for the specific user associated with the media device 1830. The selected file or summarized terms may then be transmitted to the media device to display with the content item.

Multiplexing controls may be embedded inside content streams, such as original timed text stream 1880, or rewritten timed text stream 1890. Since the content stream may contain instructions for multiplexing, a multiplexer may then simply react to those instructions, switching between the stream to select the desired timed text file in real-time. For example, in response to a content item placed in a playlist, the rewritten timed text file may be inserted into the content stream. As such, a multiplexer receiving both the original timed text content from stream 1880 or rewritten timed text content from stream 1890 may send both versions of the timed text content to the media device. In an example where both the original timed texts and the summarized timed texts are sent, the timed texted data is marked accordingly such that a decoder at the media device can parse the appropriate timed text or rewritten timed text content based on the user or system selection.

In some examples, a multiplexer for a given user may receive separate feeds with a number of sets of frames, some with original timed texts and some with summarized timed texts. Each feed may include multiplexing instructions for how that particular feed should be combined with another feed to send one combined stream to the media device. The multiplexer may select content from content database 1810 or form local storage.

It will be apparent to those of ordinary skill in the art that methods involved in the above-mentioned examples may be embodied in a computer program product that includes a computer-usable and/or -readable medium. For example, such a computer-usable medium may consist of a read-only memory device, such as a CD-ROM disk or conventional ROM device, or random-access memory, such as a hard drive device or a computer diskette, having a computer-readable program code stored thereon. It should also be understood that methods, techniques, and processes involved in the present disclosure may be executed using processing circuitry.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood in view of the below explanations:

For the avoidance of doubt, the systems and methods provided herein apply equally to subtitles and captions. For example, in some jurisdictions, the term subtitles are taken to mean a textual description that is used when the viewer can hear but cannot understand the language or accent, or the speech is not entirely clear, and so subtitles may transcribe only dialogue and some on-screen text. Captions may aim to describe to the deaf and hard of hearing all significant audio content, such as spoken dialogue and non-speech information such as the identity of speakers and, occasionally, their manner of speaking, along with any significant music or sound effects using words or symbols. However, in other jurisdictions, the term subtitles do not distinguish between subtitles and captions. Thus, for the sake of brevity throughout the following disclosure, the term subtitles will be used to mean subtitles and/or captions.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method comprising:
   accessing a user profile comprising a user's proficiency level in a secondary language;
   receiving a command to replay a first portion of a content item, wherein the first portion has a first portion duration;
   in response to receiving the replay command, accessing a data structure associated with the first portion of the content item, wherein the data structure comprises:
   a plurality of audio tracks associated with respective objects represented in the first portion of the content item, wherein each audio track of the plurality of audio tracks further includes a respective timed text, and wherein the respective timed text of each of the audio tracks comprises, in the secondary language, one of a dialog text or a non-dialog descriptive text; and
   a plurality of mappings, wherein each mapping of the plurality of mappings is associated with a respective audio track of the plurality of audio tracks, wherein each mapping of the plurality of mappings is associated with a respective time period within the first portion duration; and
   modifying the data structure to remove timed texts associated with the non-dialog descriptive text from the data structure based on the user's proficiency level; and
   generating for display, based on the modified data structure, the dialog text during the first portion duration.

2. The method of claim 1, further comprising:
   receiving a request to generate the content item in the secondary language; and
   generating for display the first portion of the content item based on the user's proficiency level in the secondary language.

3. The method of claim 1, further comprising:
   receiving a request to generate the content item in a new secondary language not in the user's profile; and
   creating a language profile for the new secondary language in the user profile.

4. The method of claim 1, further comprising:
detecting the user's proficiency level of the secondary language.

5. The method of claim 4, wherein the detecting the user's proficiency level of the secondary language comprises at least one of:
detecting if the user is using timed text in the secondary language;
detecting if the user is using audio in the secondary language;
detecting if the user is using audio in the secondary language and timed text in a primary language;
detecting if the user has ever made a replay event while using audio in the secondary language;
detecting if the user has ever made a replay event while using timed text in the secondary language;
receiving an indication of proficiency level from a third party application; or
receiving an indication of proficiency level from the user.

6. The method of claim 5, wherein a primary language is the user's native language.

7. The method of claim 1, wherein the secondary language is the user's non-native language.

8. The method of claim 1, wherein generating for display the dialog text during the first portion duration comprises at least one of:
adding timed text in a primary language to the first portion of the content item;
changing language of timed text from the secondary language to a primary language;
changing language of audio from the secondary language to a primary language; or
changing a playback speed of the first portion of the content item.

9. The method of claim 1, further comprising:
generating for display a first view and second view of the first portion of the content item;
wherein the first view of the first portion is at the user's proficiency level; and
wherein the second view of the first portion is at a level below the user's proficiency level.

10. The method of claim 1, further comprising:
generating for display metadata based on a subject-matter of the first portion; and
wherein the metadata comprises at least one of: grammar, pronunciation, diacritical markings, use in a sentence, commons phrases or sayings, a definition, synonyms, antonyms, or language of origin.

11. The method of claim 1, wherein the command is at least one of: a voice request in a primary language of the user profile, a voice request in a secondary language of the user profile, the user selecting a word in timed text, a user input, selection of a rewind button, a selection of a timeline, or a scrubbing event on a timeline.

12. The method of claim 1, further comprising:
in response to receiving the replay command, tagging the first portion of the content item; and
wherein the tag represents content that is difficult to understand at the user's proficiency level.

13. The method of claim 12, further comprising:
identifying a second portion of the content item that has been tagged as difficult;
wherein the second portion was tagged by at least one other user in historic viewing data; and
generating for display the dialog text at a level below the user's proficiency level during a second portion duration of playback of the second portion.

14. The method of claim 1, further comprising:
receiving a timed text file associated with the content item;
analyzing the timed text file;
determining the user's proficiency level;
rewriting the dialog text of the timed text file based on the user's proficiency level; and
generating for display text from the rewritten dialog text of the timed text file during consumption of the first portion of the content item.

15. The method of claim 1, further comprising:
modifying at least one of the plurality of mappings of the data structure to increase a time period of dialog text to have additional time that was freed up by the removal of the timed texts associated with non-dialog descriptive text.

16. A media device comprising a control module, a transceiver module, and a network module, configured to:
access a user profile comprising a user's proficiency level in a secondary language;
receive a command to replay a first portion of a content, wherein the first portion has a first portion duration;
in response to receiving the replay command, access a data structure associated with the first portion of the content item, wherein the data structure comprises:
a plurality of audio tracks associated with respective objects represented in the first portion of the content item, wherein each audio track of the plurality of audio tracks further includes a respective timed text, and wherein the respective timed text of each of the audio tracks comprises, in the secondary language, one of a dialog text or a non-dialog descriptive text; and
a plurality of mappings, wherein each mapping of the plurality of mappings is associated with a respective audio track of the plurality of audio tracks, wherein each mapping of the plurality of mappings is associated with a respective time period within the first portion duration; and
modifying the data structure to remove timed texts associated with the non-dialog descriptive text from the data structure based on the user's proficiency level; and
generating for display, based on the modified data structure, the dialog text during the first portion duration.

17. The media device of claim 16, further configured to:
receive a request to generate the content item in the secondary language; and
generate for display the first portion of the content item based on the user's proficiency level in the secondary language.

18. The media device of claim 16, further configured to:
receive a request to generate the content item in a new secondary language not in the user's profile; and
create a language profile for the new secondary language in the user profile.

19. The media device of claim 16, further configured to:
detect the user's proficiency level of the secondary language.

20. A system comprising:
means for accessing a user profile comprising a user's proficiency level in a secondary language;
means for receiving a command to replay a first portion of a content, wherein the first portion has a first portion duration;

in response to receiving the replay command, means for accessing a data structure associated with the first portion of the content item, wherein the data structure comprises:
  a plurality of audio tracks associated with respective objects represented in the first portion of the content item, wherein each audio track of the plurality of audio tracks further includes a respective timed text, and wherein the respective timed text of each of the audio tracks comprises, in the secondary language, one of a dialog text or a non-dialog descriptive text; and
  a plurality of mappings, wherein each mapping of the plurality of mappings is associated with a respective audio track of the plurality of audio tracks, wherein each mapping of the plurality of mappings is associated with a respective time period within the first portion duration; and
modifying the data structure to remove timed texts associated with the non-dialog descriptive text from the data structure based on the user's proficiency level; and
generating for display, based on the modified data structure, the dialog text during the first portion duration.

* * * * *